(12) United States Patent
Ohtake et al.

(10) Patent No.: US 6,577,452 B2
(45) Date of Patent: Jun. 10, 2003

(54) VARIABLE FOCAL LENGTH LENS SYSTEM

(75) Inventors: Motoyuki Ohtake, Saitama (JP); Toshinori Take, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/054,892

(22) Filed: Jan. 25, 2002

(65) Prior Publication Data

US 2003/0002172 A1 Jan. 2, 2003

(30) Foreign Application Priority Data

Jan. 31, 2001 (JP) .............................. 2001-024540
Jan. 31, 2001 (JP) .............................. 2001-024558

(51) Int. Cl.[7] .............................................. G02B 15/22
(52) U.S. Cl. ..................... 359/693; 359/689; 359/716
(58) Field of Search .................... 359/676, 689, 359/690, 716, 740, 791, 693

(56) References Cited

U.S. PATENT DOCUMENTS

| | | | | |
|---|---|---|---|---|
| 4,978,204 | A | 12/1990 | Ito | 359/689 |
| 5,113,287 | A | 5/1992 | Nakayama | 359/676 |
| 5,721,643 | A | 2/1998 | Hagimori | 359/689 |
| 6,342,975 | B1 * | 1/2000 | Yamanashi | 359/689 |
| 6,108,137 | A | 8/2000 | Ohtake et al. | 359/689 |
| 6,271,973 | B1 | 8/2001 | Ohtake et al. | 359/689 |
| 6,333,822 | B1 | 12/2001 | Ohtake | 359/684 |
| 6,392,818 | B1 * | 5/2002 | Sato | 359/689 |

FOREIGN PATENT DOCUMENTS

| | | |
|---|---|---|
| JP | 56-128911 | 8/1981 |
| JP | 1-288823 | 11/1989 |
| JP | 2-16515 | 1/1990 |
| JP | 2-73211 | 3/1990 |
| JP | 7-151953 | 6/1995 |
| JP | 8-262325 | 10/1996 |
| JP | 2000-56223 | 2/2000 |
| JP | 2000-66100 | 3/2000 |
| JP | 2000-155263 | 6/2000 |
| JP | 2000-305019 | 11/2000 |
| JP | 2001-4921 | 1/2001 |
| JP | 2001-117003 | 4/2001 |

* cited by examiner

*Primary Examiner*—Georgia Epps
*Assistant Examiner*—M. Hasan
(74) *Attorney, Agent, or Firm*—Miles & Stockbridge P.C.

(57) ABSTRACT

A variable focal length lens system comprises, from the object side, a positive first lens group, a positive second lens group and a negative third lens group. The lens groups are moved toward the object side such that, when changing from wide angle to telephoto, distance between the first lens group and the second lens group is increased and distance between the second lens group and the third lens group is decreased. An aperture stop disposed in the vicinity of the second lens group moves together with the second lens group; the third lens group is composed of a positive lens with the convex surface facing the image side and a negative lens disposed away from the positive lens toward the image side and having the concave surface facing the object side; and the positive lens is a double aspherical lens and satisfies predetermined conditions.

23 Claims, 20 Drawing Sheets

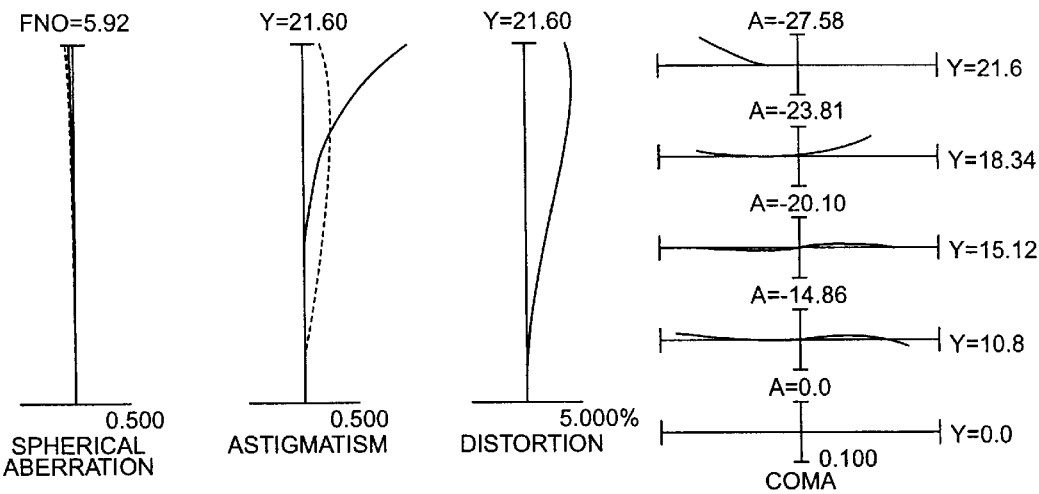
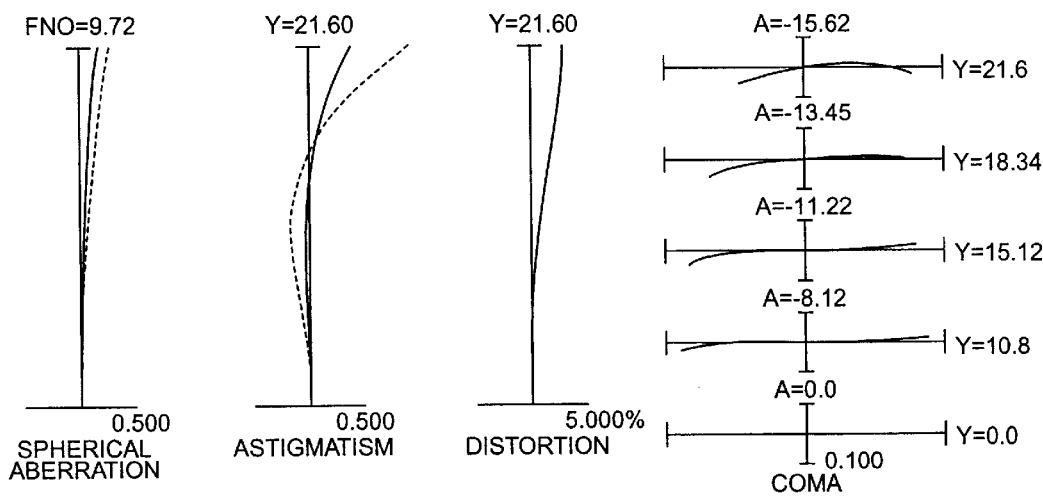
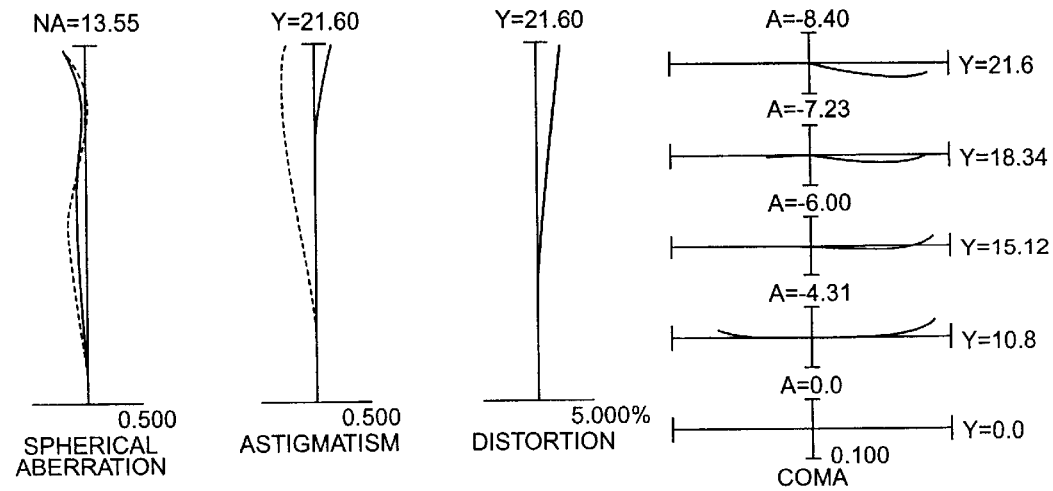

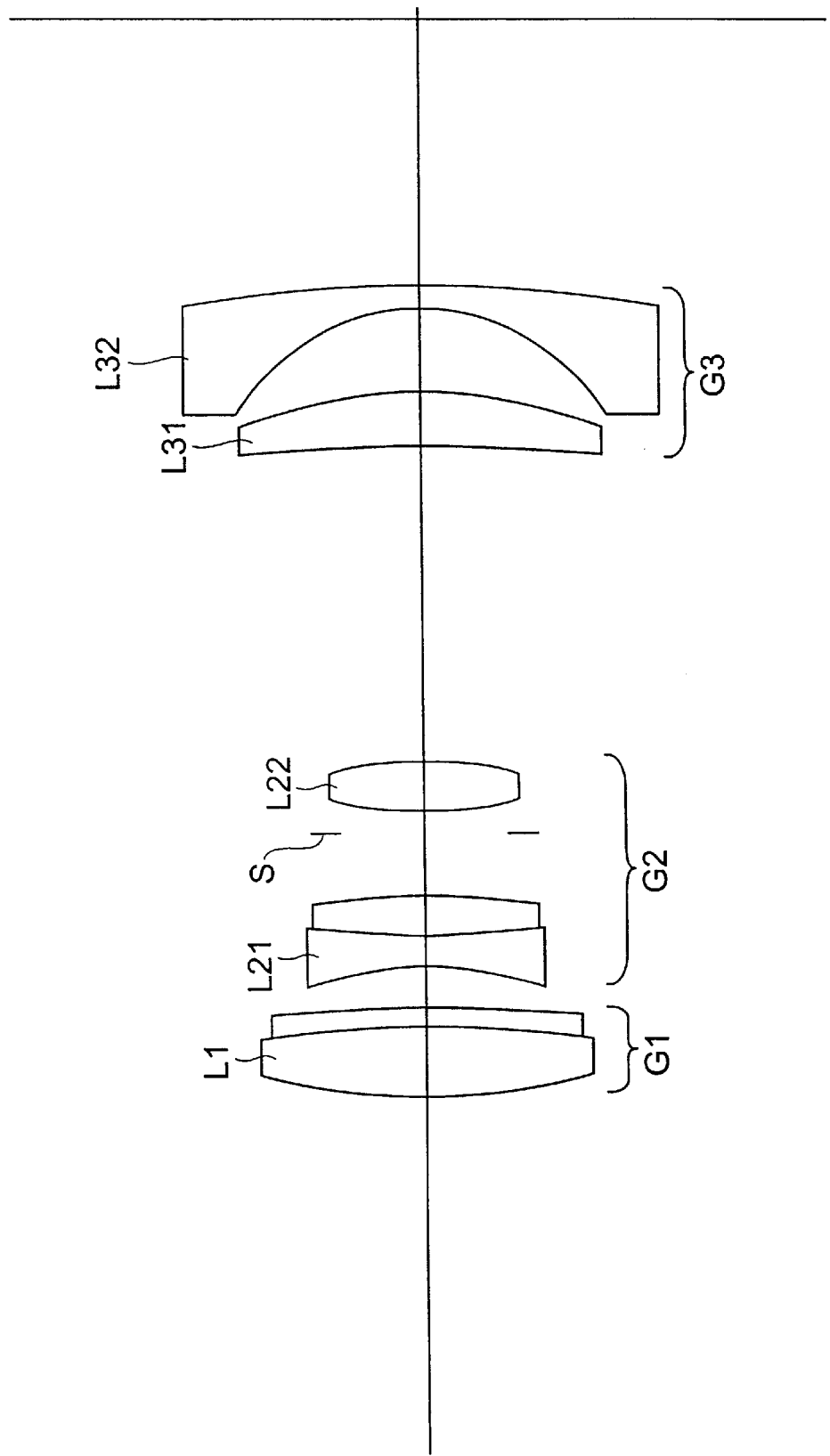

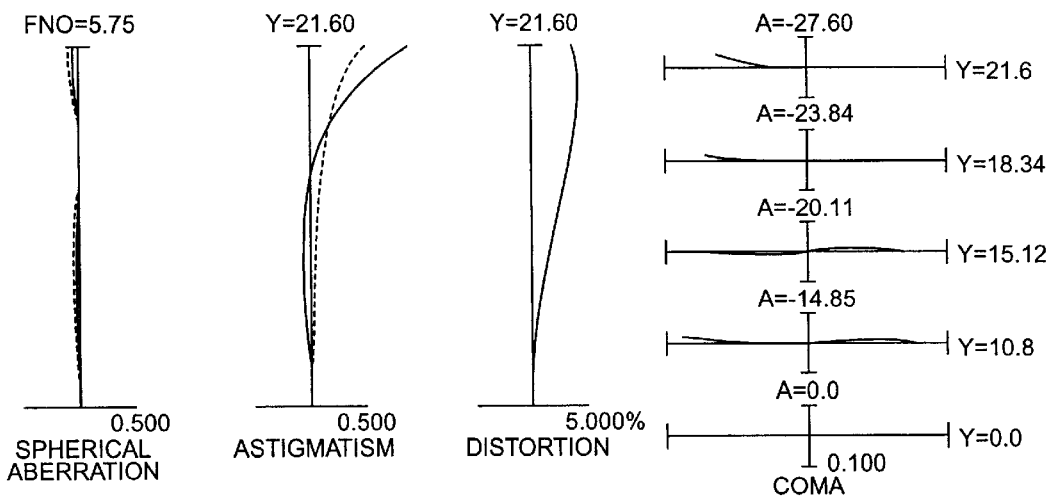
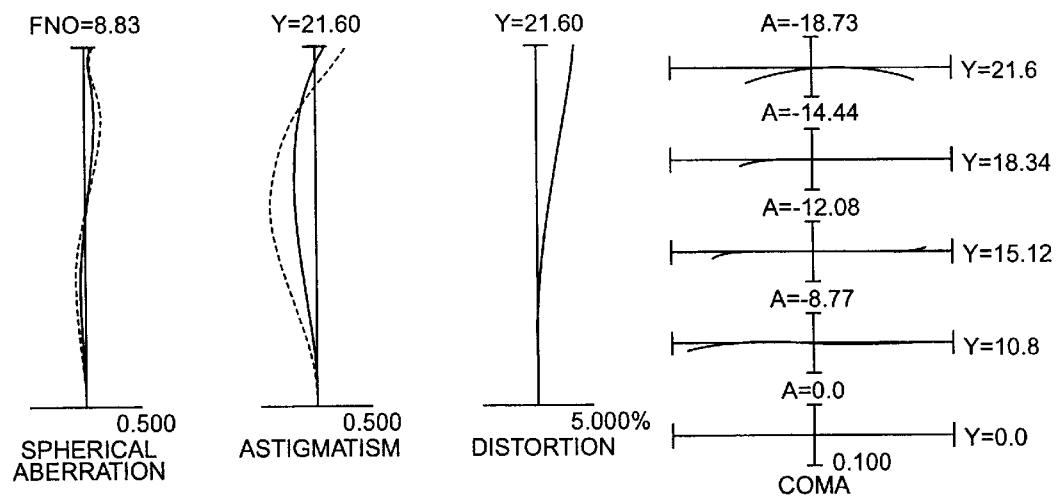
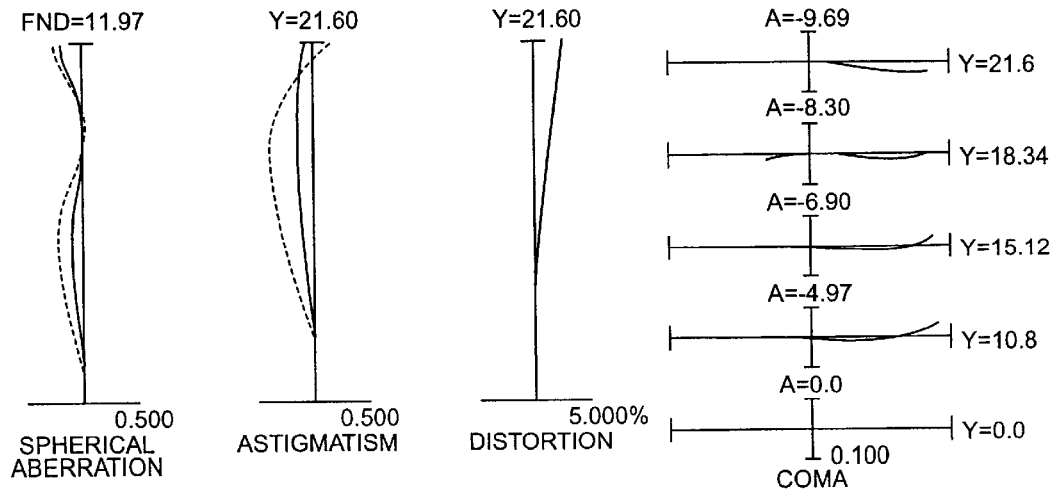

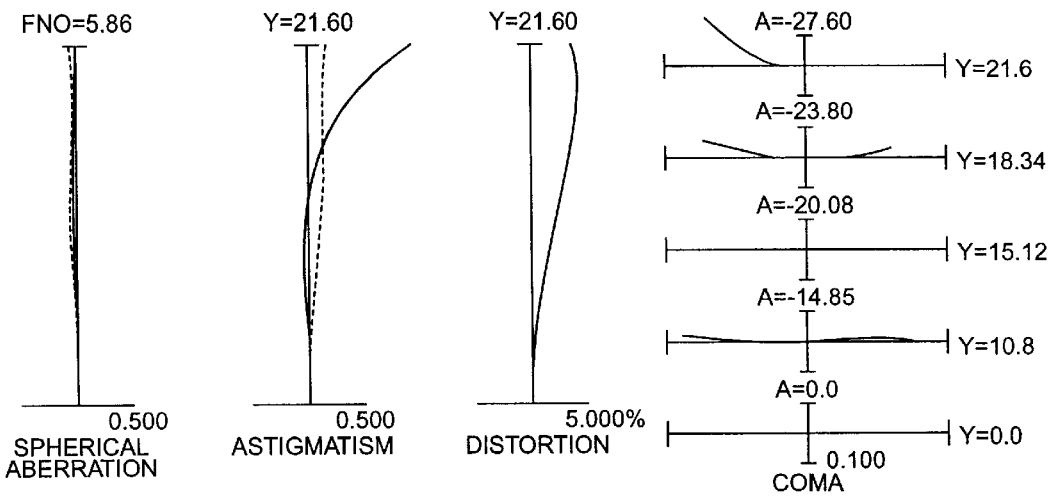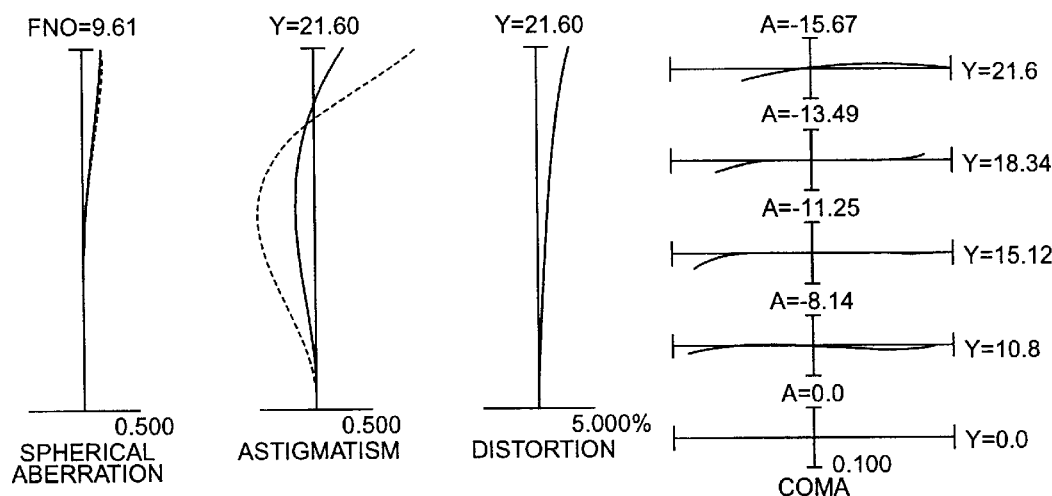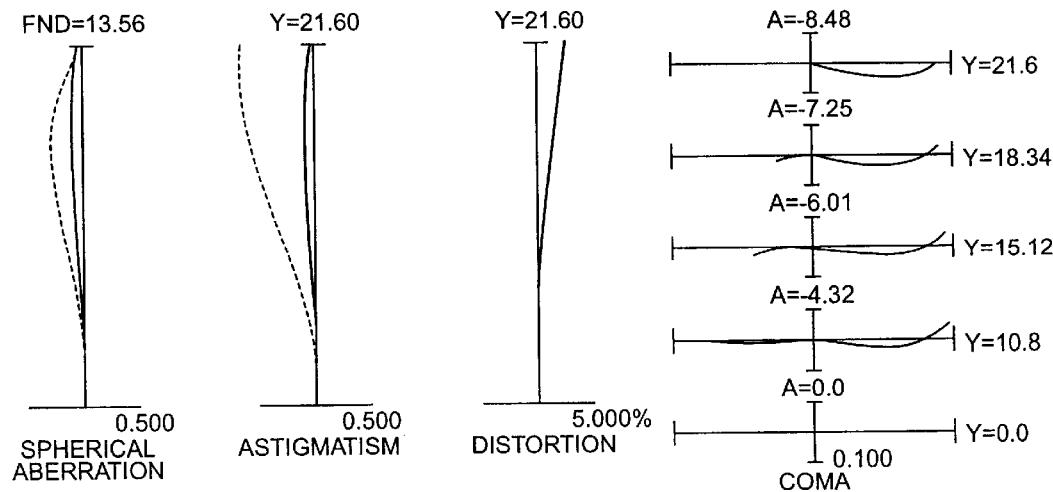

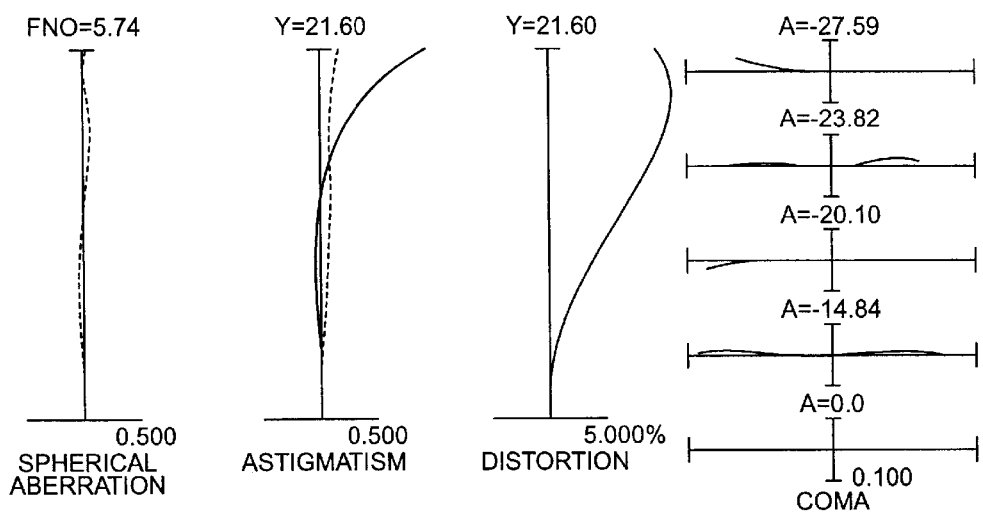

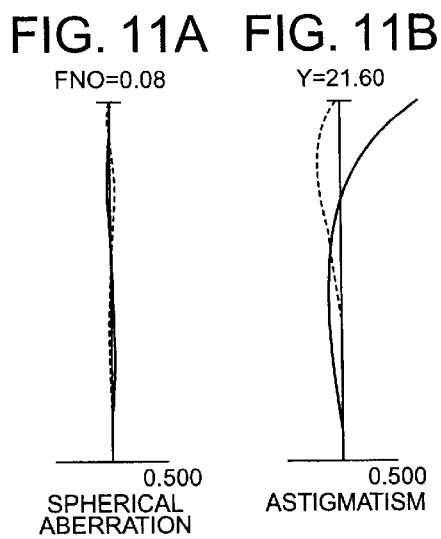
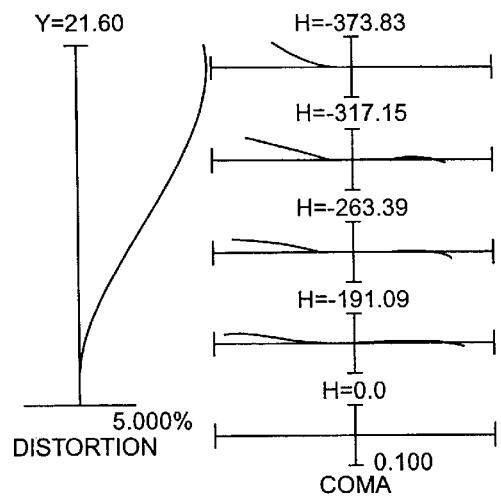
FIG. 11A FNO=0.08 0.500 SPHERICAL ABERRATION
FIG. 11B Y=21.60 0.500 ASTIGMATISM
FIG. 11C Y=21.60 5.000% DISTORTION
FIG. 11D H=-373.83, H=-317.15, H=-263.39, H=-191.09, H=0.0 0.100 COMA
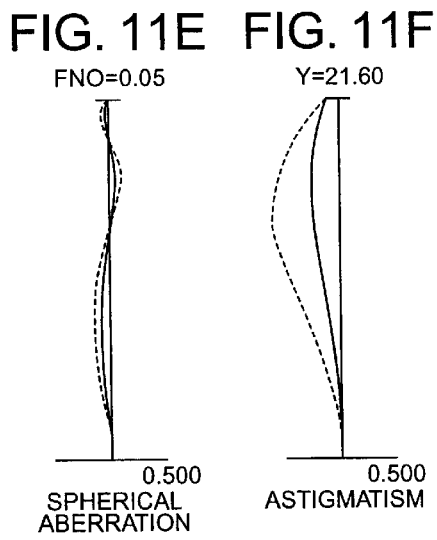
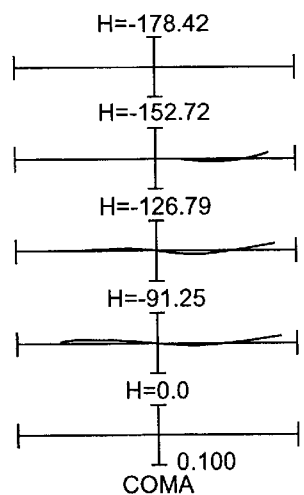
FIG. 11E FNO=0.05 0.500 SPHERICAL ABERRATION
FIG. 11F Y=21.60 0.500 ASTIGMATISM
FIG. 11G Y=21.60 5.000% DISTORTION
FIG. 11H H=-178.42, H=-152.72, H=-126.79, H=-91.25, H=0.0 0.100 COMA
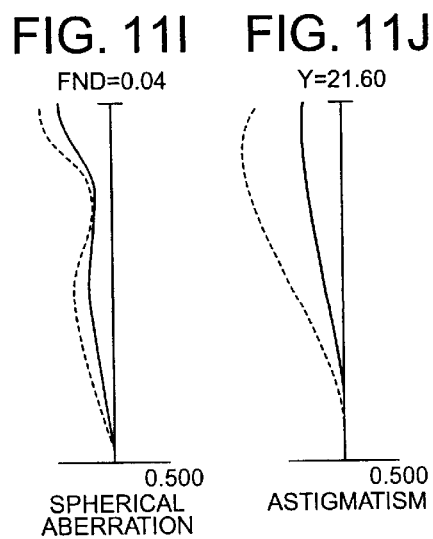
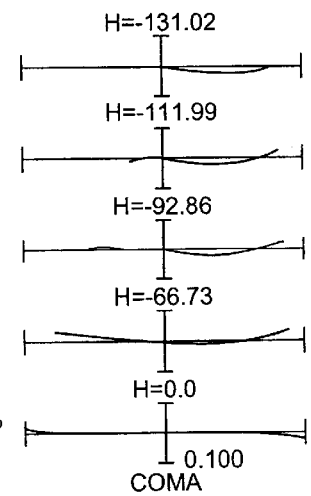
FIG. 11I FND=0.04 0.500 SPHERICAL ABERRATION
FIG. 11J Y=21.60 0.500 ASTIGMATISM
FIG. 11K Y=21.60 5.000% DISTORTION
FIG. 11L H=-131.02, H=-111.99, H=-92.86, H=-66.73, H=0.0 0.100 COMA

FNO=5.88
0.500
SPHERICAL ABERRATION

Y=21.60
0.500
ASTIGMATISM

Y=21.60
5.000%
DISTORTION

A=-27.62
A=-23.91
A=-20.17
A=-14.88
A=0.0
0.100
COMA

FNO=9.88
0.500
SPHERICAL ABERRATION

Y=21.60
0.500
ASTIGMATISM

Y=21.60
5.000%
DISTORTION

A=-14.41
A=-12.40
A=-10.35
A=-7.49
A=0.0
0.100
COMA

FND=12.02
0.500
SPHERICAL ABERRATION

Y=21.60
0.500
ASTIGMATISM

Y=21.60
5.000%
DISTORTION

A=-9.66
A=-8.28
A=-6.89
A=-4.96
A=0.0
0.100
COMA

FNO=0.08

0.500
SPHERICAL
ABERRATION

Y=21.60

0.500
ASTIGMATISM

Y=21.60

5.000%
DISTORTION

H=-374.14

H=-318.11

H=-264.18

H=-191.45

H=0.0

0.100
COMA

FNO=0.05

0.500
SPHERICAL
ABERRATION

Y=21.60

0.500
ASTIGMATISM

Y=21.60

5.000%
DISTORTION

H=-179.04

H=-153.32

H=-127.33

H=-91.67

H=0.0

0.100
COMA

FND=0.04

0.500
SPHERICAL
ABERRATION

Y=21.60

0.500
ASTIGMATISM

Y=21.60

5.000%
DISTORTION

H=-131.03

H=-112.06

H=-92.96

H=-66.83

H=0.0

0.100
COMA

FNO=4.81

0.500
SPHERICAL ABERRATION

Y=21.60

0.500
ASTIGMATISM

Y=21.60

5.000%
DISTORTION

A=-27.61
A=-23.85
A=-20.12
A=-14.86
A=0.0
0.100
COMA

FNO=9.68

0.500
SPHERICAL ABERRATION

Y=21.60

0.500
ASTIGMATISM

Y=21.60

5.000%
DISTORTION

A=-12.26
A=-10.53
A=-8.77
A=-6.33
A=0.0
0.100
COMA

FND=12.05

0.500
SPHERICAL ABERRATION

Y=21.60

0.500
ASTIGMATISM

Y=21.60

5.000%
DISTORTION

A=-8.43
A=-7.22
A=-5.99
A=-4.31
A=0.0
0.100
COMA

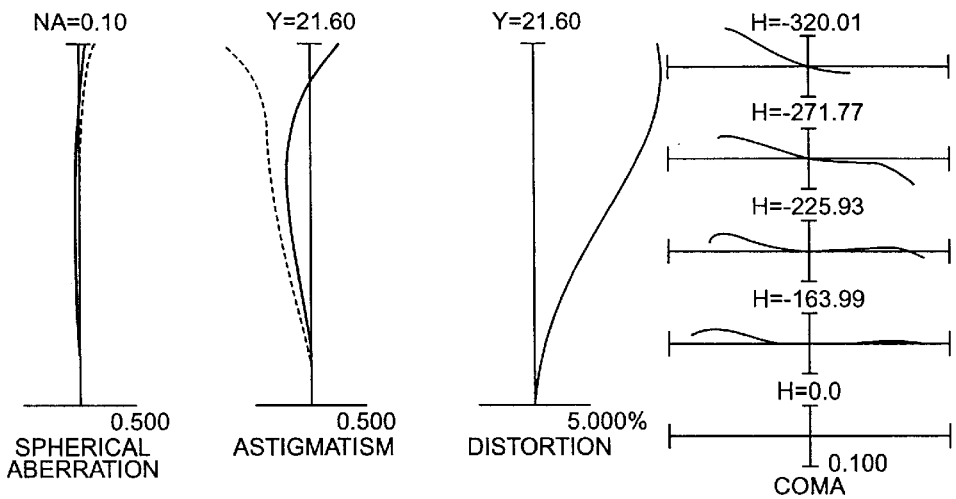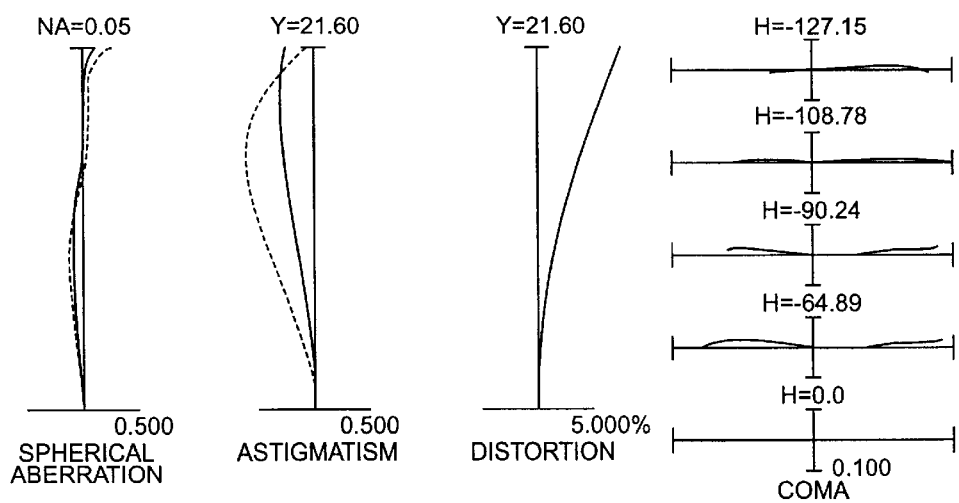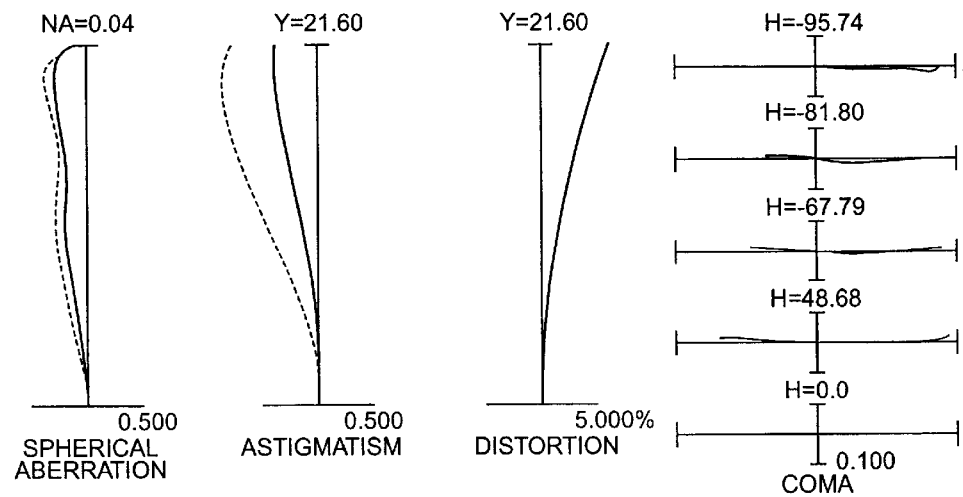

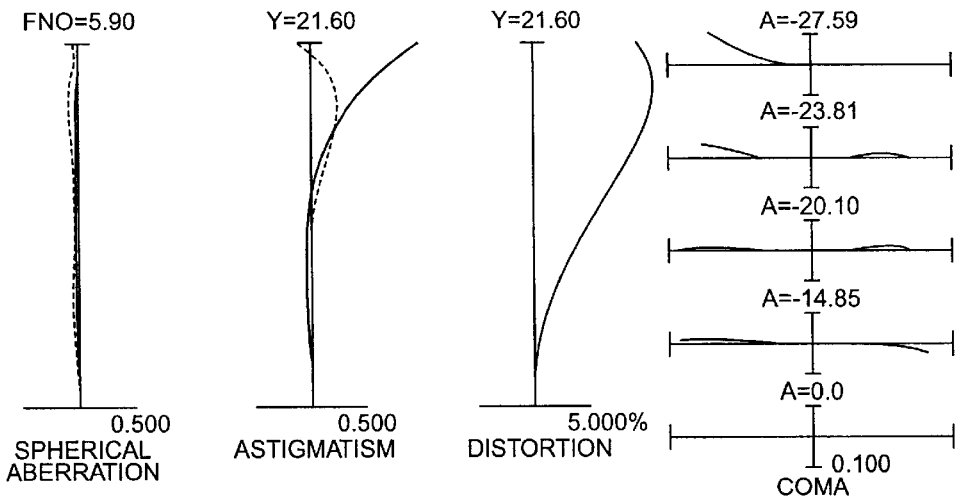
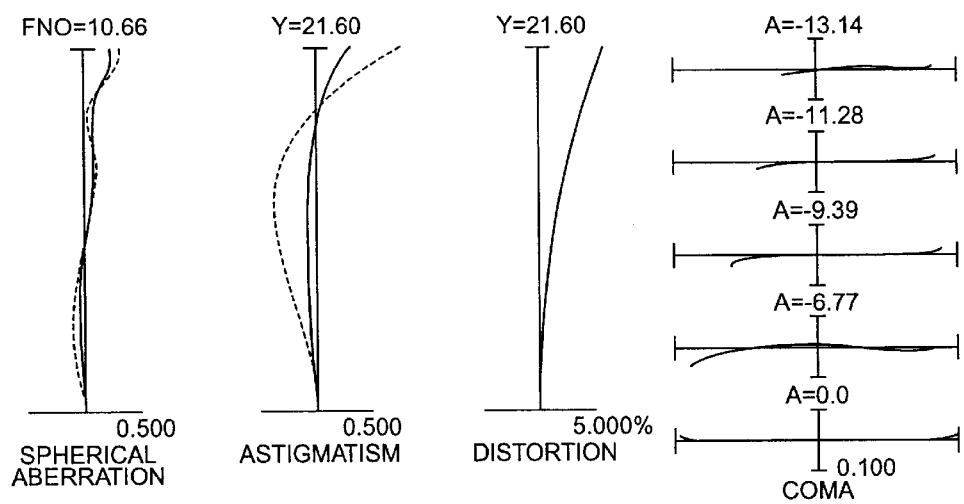
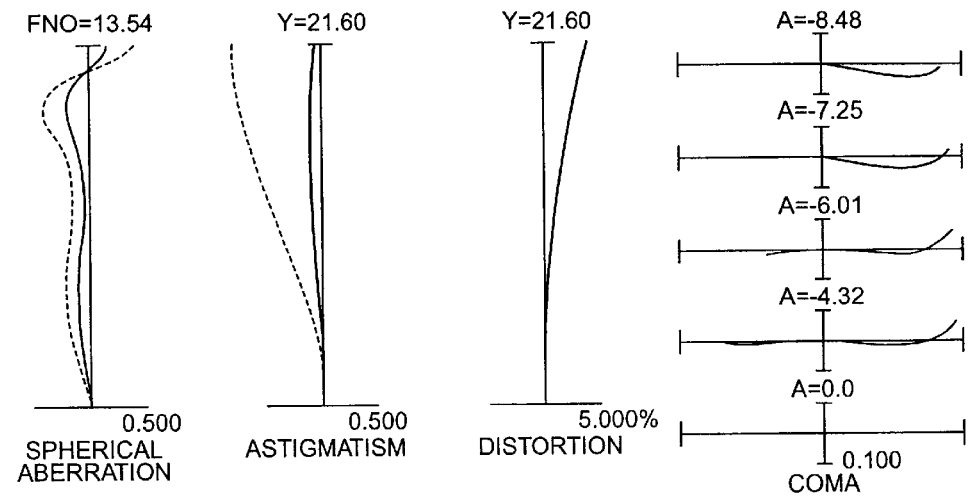

NA=0.08
0.500
SPHERICAL ABERRATION

Y=21.60
0.500
ASTIGMATISM

Y=21.60
5.000%
DISTORTION

H=-366.83
H=-311.49
H=-258.94
H=-187.98
H=0.0
0.100
COMA

NA=0.04
0.500
SPHERICAL ABERRATION

Y=21.60
0.500
ASTIGMATISM

Y=21.60
5.000%
DISTORTION

H=-159.86
H=-136.58
H=-113.20
H=-81.31
H=0.0
0.100
COMA

NA=0.04
0.500
SPHERICAL ABERRATION

Y=21.60
0.500
ASTIGMATISM

Y=21.60
5.000%
DISTORTION

H=-113.59
H=-96.88
H=-80.17
H=-57.49
H=0.0
0.100
COMA

VARIABLE FOCAL LENGTH LENS SYSTEM

This application claims the benefit of Japanese Patent applications Nos. 2001-024540 and 2001-024558 which are hereby incorporated by reference.

BACKGROUND OF THE INVENTION

1. Field of the Invention

The present invention relates to a variable focal length lens system and, in particular, relates to a variable focal length lens system suitable for a high zooming ratio, and a small-sized variable focal length lens system capable of near distance focusing with a small number of lens elements at a high zooming ratio.

2. Related Background Art

Excellent portability is regarded as important for a lens shutter type camera by the users. In order to achieve such excellent portability, that is, to obtain a camera with excellently reduced weight and size, it is important to reduce the total size of a picture-taking optical system, and the thickness and the diameter of each lens element.

A lens shutter type camera generally employs a zoom lens as the picture-taking optical system. The zoom lens is adapted to enlarge an image which is formed by means of a lens group disposed closer to the object side than this zoom lens, in a refractive power layout of a so-called telephoto type in which a negative lens group is disposed on the most image surface side. It is possible to achieve a predetermined zooming ratio by moving the negative lens group in such a manner that a magnification change ratio becomes small in a wide angle end state and becomes large in a telephoto end state when the positional state of the lens is changed from the wide angle end state to the telephoto end state. Simultaneously, an aperture stop is disposed in such a manner that a distance between the aperture stop and the negative lens group is wide in the wide angle end state, and is gradually decreased to follow a change in the positional state of the lens from the wide angle end state to the telephoto end state, so as to be narrowest in the telephoto end state. Consequently, in the telephoto end state, an off-axis light flux passes away from the optical axis. Also, the closer the lens position comes to the telephoto end state, the closer the off-axis light flux comes to the optical axis. By arranging the lens system as described above, it is possible to satisfactorily correct variations of off-axial aberrations which are caused by changes of the lens positional state.

In these picture-taking optical systems, since the distance between the negative lens group and the aperture stop is wide in the telephoto end state, the lens diameter of the negative lens group tends to be large. Consequently, it is important to reduce the lens diameter of the negative lens group, in order to reduce the lens barrel size, and to further reduce the height and the width of the camera body.

A zoom lens with a high zooming ratio is generally provided with three or more movable lens groups, which is a so-called multi-group zoom lens system. As such a lens system, a positive/positive/negative three-group type zoom lens system which has a comparatively small number of variable lens groups is mainly used. This positive-positive-negative three-group zoom lens system is composed of three lens groups, which includes a positive lens group, a positive lens group and a negative lens group, from the object side in this order.

For example, in a zoom lens system disclosed in Japanese Patent Application Laid-Open No. 2000-66100, a negative lens group is composed of three lenses including a positive lens with the convex surface facing the image side, a negative lens with the concave surface facing the object side and a negative lens with the concave surface facing the object side from the object side in this order.

Also, in a lens system disclosed in Japanese Patent Application Laid-Open No. 2000-56223, a negative lens group is composed of two lenses which include a positive lens with the convex surface facing the image side and a negative lens with the concave surface facing the object side from the object side in this order. In this lens system, the lens surface of the positive lens on the object side is formed aspherical. With this arrangement, it is possible to increase the degree of freedom in correcting aberrations and, instead, reduce the number of the lenses by one.

Further, in a lens system disclosed in Japanese Patent Application Laid-Open No. 2000-155263, a positive lens in a negative lens group is formed as a double aspherical lens. With this arrangement, it is possible to increase the degree of freedom in correcting aberrations and to enhance the performance of the lens system.

In order to reduce a lens diameter, it is the most appropriate to approximate an off-axis light flux reaching a negative lens to the optical axis with strong convergence effect of a positive lens. However, when the convergent effect of the positive lens is enhanced, a negative spherical aberration is generated in a large amount. For this reason, the convergence effect in the periphery of the optical axis is increased, compared with around the optical axis with introduction of an aspherical surface, so as to enhance the refractive power and to reduce the lens diameter.

As it becomes common to provide a zoom lens system as an picture-taking optical system, in order to enhance a zooming ratio, such cameras of a type in which the focal length thereof is large in a telephoto end state have been widely spread. The zooming ratio in this case equals to the quotient which is obtained by dividing the focal length in the telephoto end state by the focal length in the wide angle end state. With the increase of the focal length in the telephoto end state, the total length of the lens system becomes large, which results in poor portability. Accordingly, when carrying a camera, a zoom lens system is accommodated in the camera body in such a manner that spaces between the lens groups are reduced to the minimum, so as to improve the portability.

As a conventional zoom lens, a zoom lens, for example, disclosed in Japanese Patent Application Laid-Open No. 56-128911 is known. This zoom lens is of a two-group zoom type of positive and negative lenses, composed of a first lens group having a positive refractive power and a second lens group having a negative refractive power from the object side in this order. In this zoom lens type, the respective lens groups are moved toward the object side in such a manner that a distance between the first lens group and the second lens group is reduced when the focal length is changed from the wide angle end state to the telephoto end state, so as to change the focal length. However, when a zooming ratio is increased by 2.5 times or more, the total length of the lens system in the telephoto end state becomes extremely large. For this reason, there is proposed a zoom type of positive-positive-negative three groups, which has an additional variable lens group.

A lens of this three group zoom type is disclosed, for example, in Japanese Patent Application Laid-Open No. 2-16515, The disclosed lens system is of a positive-positive-negative three group zoom type, which comprises a first lens group having a positive refractive power, a second lens group having a positive refractive power and a third lens group having a negative refractive power from the object side in this order. In this zoom type lens, the respective lens groups are moved toward the object side in such a manner that a distance between the first lens group and the second lens group is increased and a distance between the second lens group and the third lens group is decreased when the focal length is changed from the wide angle end state to the telephoto end state, so as to change the focal length. With the increase of the number of the variable lens groups as described above, it is possible to reduce the total length of the lens system even if a zooming ratio is increased.

On the other hand, there is known a near distance focusing method as disclosed, for example, in Japanese Patent Application Laid-Open No. 7-151953. By this method, a zooming operation and a focusing operation can be conducted with a single driving source. In accordance with an angle of rotation to be given to a zoom ring, the lens positional state is changed from a wide angle end state (infinity focusing), to another wide angle end state (near distance focusing), to a telephoto end state (infinity focusing), and to another telephoto end state (near distance focusing), and the first lens group is arranged to be moved toward the object side accordingly.

As described above, in the lens system disclosed in Japanese Patent Application Laid-Open No. 2000-56223, the lens surface on the object side of the positive lens takes an aspherical form. This aspherical form effects divergence around the optical axis, and convergence in the peripheral area. In the vicinity of the optical axis, the concave surface of the lens faces the aperture stop to smoothly refract an off-axis light flux. On the other hand, in the peripheral area, the convex surface of the lens faces the aperture stop so that the light flux is rapidly refracted. For this reason, the performance of the lens system may be abruptly deteriorated even by a slight decentration.

Also, in the lens system disclosed in Japanese Patent Application Laid-Open No. 2000-155263, the positive lens is formed as a double aspherical lens, as described above. With this arrangement, the convergence effect of the lens surface on the image side becomes stronger in the peripheral area. For this reason, the deterioration of the performance due to a slight decentration can be satisfactorily suppressed. However, since the radius of curvature in the peripheral area is rapidly decreased, it is difficult to process the aspherical lens.

With the increase of the focal length in the telephoto end state, the total length of the lens system in the telephoto end state becomes large. For this reason, the size of the lens barrel also becomes large. In addition, the length of each of the barrel elements for constituting the lens barrel also becomes large, so as to cause inconveniences to the portability. Accordingly, it conceivable that the thickness of the camera in its accommodated state is reduced, by increasing the number of the barrel elements and reducing the length of each barrel element. However, on the contrary, the diameter of the lens barrel becomes large, and the height and the width of the camera body become large, too. As a result, the portability is spoiled.

Furthermore, it is conceivable to avoid inconveniences to the portability by reducing the total length of the lens system in the telephoto end state. In order to reduce the total length of the lens system, it is possible, for example, to reinforce the refractive power of each lens group, or to increase the number of movable lens groups. However, in the former case, the accuracy in stopping each lens group may be extremely high, or the performance of the lens system may be greatly deteriorated. In the latter case, the number of lenses becomes large, which is against the object of the present invention for achieving a light-weight and compact variable focal length lens system with a smaller number of lens elements.

According to the method of near distance focusing disclosed in Japanese Patent Application Laid-Open No. 7-151953, in the telephoto end state at a near distance focusing, the first lens group is fed out toward the object side. For this reason, the total length of the lens system in this case becomes larger than that of the lens system in the telephoto end state at an infinity focusing.

SUMMARY OF THE INVENTION

An object of a first aspect of the invention is to provide a variable focal length lens system of a reduced size and an increased zooming ratio in spite of a smaller number of lens elements for constituting the lens system.

In order to achieve the above object, according to the first aspect of the invention, there is provided a variable focal length lens system which comprises:

a first lens group having a positive refractive power, a second lens group having a positive refractive power, and a third lens group having a negative refractive power from the side of an object in this order, wherein the respective lens groups are moved toward the object side in such a manner that a distance between said first lens group and said second lens group is increased and a distance between said second lens group and said third lens group is decreased when the lens positional state is changed from a wide angle end state to a telephoto end state;

an aperture stop is disposed in the vicinity of said second lens group and is moved together with said second lens group in accordance with a change of the lens positional state;

said third lens group is composed of a positive lens with the convex surface facing the image side and a negative lens disposed on the image side of said positive lens to have an air gap therebetween and have the concave surface facing the object side, said positive lens being a double aspherical lens and satisfying the following condition:

$$0.9 < \kappa a (Ya/Ra)^2 < 1.3,$$

where:
κa is a conical constant of an image-side lens surface of the double aspherical lens disposed in said third lens group;
Ya is an amount defined by the following expression:

$$Ya = Y\max \cdot (DA/DS),$$

where Ymax is a half of a vertical angle of the frame, DA is a distance from said image-side lens surface to the image surface in the wide angle end state, and DS is a distance between said aperture stop to said image surface in the wide angle end state; and
Ra is a paraxial radius of curvature of said image-side lens surface.

An object of a second aspect of the invention is to provide a small-sized variable focal length lens system with a high zooming ratio which is suitable for obtaining a high zooming ratio with a smaller number of lens elements and which is capable of effecting near distance focusing.

In order to achieve the above object, according to the second aspect of the present invention, there is provided a variable focal length lens system which is capable of a near distance focusing and comprises a first lens group having a positive refractive power, a second lens group having a positive refractive power, and a third lens group having a negative refractive power from the side of an object in this order, wherein the respective lens groups are moved toward the object side in such a manner that a distance between said first lens group and said second lens group is increased and a distance between said second lens group and said third lens group is decreased when the focal length is changed from a wide angle end state to a telephoto end state, which lens system being characterized in that:

in the wide angle end state, at least said first lens group is moved toward the object side when a near distance focusing operation is effected, while in the telephoto end state, at least said first lens group is moved toward the image side when a near distance focusing operation is effected, so as to satisfy the following conditions:

$$0.2 < \gamma_{3w} < 0.7,$$

and $$1.1 < \gamma_{3t} < 1.5,$$

where $\gamma_{3w}$ is a ratio of an amount of movement (movement ratio) of the third lens group with respect to an amount of movement of the first lens group in the wide angle end state at the near distance focusing, and $\gamma_{3t}$ is a ratio of an amount of movement (movement ratio) of the third lens group with respect to an amount of movement of the first lens group in the telephoto end state at the near distance focusing.

BRIEF DESCRIPTION OF THE DRAWINGS

FIGS. 3A through 3D, 3E through 3H, and 3I through 3L are graphs for showing aberrations in a wide angle end state, an intermediate focal length state and a telephoto end state, respectively, focused at infinity according to the first embodiment.

FIG. 4 is a cross-sectional view for showing the configuration of a variable focal length lens system according to a second embodiment of the present invention.

FIGS. 5A through 5D, 5E through 5H, and 5I through 5L are graphs for showing aberrations in the wide angle end state, the intermediate focal length state and the telephoto end state, respectively, focused at infinity according to the second embodiment.

FIGS. 7A through 7D, 7E through 7H, and 7I through 7L are graphs for showing aberrations in the wide angle end state, the intermediate focal length state and the telephoto end state, respectively, focused at infinity according to the third embodiment.

FIGS. 10A through 10D, 10E through 10H, and 10I through 10L are graphs for showing aberrations in the wide angle end state, the intermediate focal length state and the telephoto end state, respectively, focused at infinity according to the fourth embodiment.

FIGS. 11A through 11D, 11E through 11H, and 11I through 11L are graphs for showing aberrations in the wide angle end state, the intermediate focal length state and the telephoto end state, respectively, focused at near distance according to the fourth embodiment.

FIGS. 17A through 17D, 17E through 17H, and 17I through 17L are graphs for showing aberrations in the wide angle end state, the intermediate focal length state and the telephoto end state, respectively, focused at near distance according to the sixth embodiment.

FIGS. 19A through 19D, 19E through 19H, and 19I through 19L are graphs for showing aberrations in the wide angle end state, the intermediate focal length state and the telephoto end state, respectively, focused at infinity according to the seventh embodiment.

DESCRIPTION OF THE PREFERRED EMBODIMENTS

Figure 1:
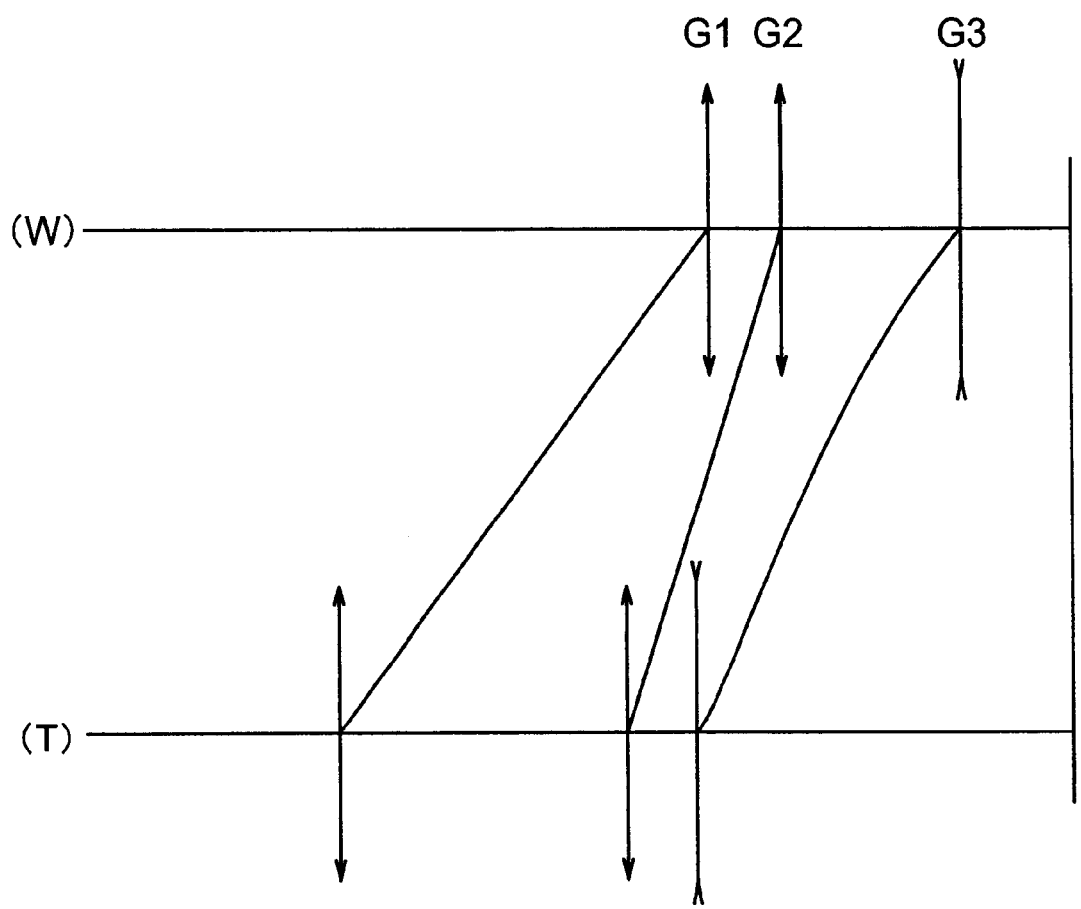
FIG. 1 is a graph for showing a layout of refractive power of a variable focal length lens system according to each embodiment of the first aspect of the present invention and for showing a state of movement of each lens group in the course of change of the focal length state from a wide angle end state (W) to a telephoto end state (T).

Description will be made below now on a configuration of a variable focal length lens system according to the first aspect of the invention. First, a general description on an aspherical lens will be given.

In general, on an aspherical lens which is disposed in a lens group having a positive refracting power, the positive refractive power is gradually decreased from the center of the lens toward the lens peripheral area, which is caused by the fact that a negative spherical aberration tends to occur in a positive lens group.

On the other hand, on an aspherical lens which is disposed in a lens group having a negative refracting power, the positive refractive power is gradually increased from the center of the lens toward the lens peripheral area, which is as disclosed, for example, in Japanese Patent Application Laid-Open No. 1-288823.

An aspherical lens is generally defined by the following expression:

$$X=cy^2/\{1+(1-\kappa c^2 y^2)^{1/2}\}+C_4 y^4 + C_6 y^6 + \ldots$$

According to the present invention, a conical constant $\kappa$ is appropriately set in order to solve the problem related to the radius of curvature described above.

As described above, with respect to the aspherical lens disposed in the negative lens group, the positive refractive power is gradually increased toward the lens peripheral area from the center of the lens. In other words, from the center of the lens toward the lens peripheral area, the curvature is changing positively and the conical constant $\kappa$ tends to exceed 1.

As the conical constant $\kappa$ is increased to exceed 1, the curvature in the lens peripheral area is largely changed with respect to the center of the lens. As a result, a larger aspherical effect can be obtained. However, if the aspherical effect is too large, the following problem will arise.

That is, when a value for "$1-\kappa c^2 y^2$" in the above aspherical expression is negative, "$(1-\kappa c^2 y^2)^{1/2}$" takes an imaginary number. As the height y from the optical axis is gradually increased, a value for "$1-\kappa c^2 y^2$" is approximated to 0. Then, when this value is extremely close to 0, the curvature is sharply changed positively. Then, the curvature becomes infinity at a position where the value for "$1-\kappa c^2 y^2$" is 0. Above this height, there exists no solution.

Thus, according to the present invention, this problem is solved by appropriately setting the conical constant $\kappa$.

More specifically, a variable focal length lens system according to the present invention comprises a first lens group having a positive refractive power, a second lens group having a positive refractive power and a third lens group having a negative refractive power from the object side in this order. Then, the respective lens groups are moved toward the object side in such a manner that, when the positional state of the lens is changed from a wide angle end state (with the smallest focal length) to a telephoto end state (with the largest focal length), the distance between the first lens group and the second lens group is increased and the distance between the second lens group and the third lens group is decreased. In addition, the lens system is arranged to satisfy the following terms (A) to (C). With these arrangements, it is possible to achieve an optical system which is suitable for a reduced lens size and a reduced total length of the lens system.

Description will be made on the terms (A) to (C) below.

(A) An aperture stop should be disposed in the vicinity of the second lens group.

(B) The third lens group should be composed of a positive lens with the convex surface facing the image side, and a negative lens disposed on the image side of this positive lens with the concave surface thereof facing the object side.

(C) The positive lens disposed in the third lens group should be a double aspherical lens of which a lens surface on the object side has a negative radius of curvature with a negative refractive power gradually decreased as the lens passes away from the optical axis, and a lens surface on the image side has a negative radius of curvature with a positive refractive power gradually increased as the lens passes away from the optical axis.

The term (A) relates to disposition of the aperture stop in the lens system.

Generally, in a lens system having a high zooming ratio, it is essential to dispose an aperture stop near the center of the lens system. Then, it is essential to positively change a distance between each lens group and the aperture stop when the lens positional state is changed.

According to the present invention, a light flux passing through the first lens group passes near the optical axis in the wide angle end state, and gradually passes away from the optical axis when the lens positional state is moving toward the telephoto end state. On the contrary, an off-axis light flux passing through the third lens group passes away from the optical axis in the wide angle end state and gradually moves toward the optical axis when the lens positional state is changed toward the telephoto end state. By positively changing the distance between each adjacent lenses in this manner, it becomes possible to correct off-axial aberrations mainly in the third lens group in the wide angle end state and to correct off-axial aberrations mainly in the first lens group in the telephoto end state. As a result, even if the zooming ratio is high, it is possible to correct with excellency a variation in the off-axial aberration which is generated in response to a change of the lens positional state.

The term (B) relates to the lens configuration of the third lens group.

The third lens group is composed of a positive lens and a negative lens which is disposed on the image side of this positive lens. With this configuration, in the wide angle end state, an off-axis light flux is, after being converged by the positive lens, diverged by the negative lens. For this reason, it is possible to reduce the lens diameter.

Particularly, it is arranged such that the lens surface of the positive lens on the image surface side should be a convex surface and the lens surface of the negative lens on the object side should a concave surface. With this configuration, it is possible to correct axial aberrations and off-axial aberrations with excellency by utilizing an optical path difference which is generated in an air gap formed between the positive lens and the negative lens.

The term (C) relates to the configuration of the positive lens disposed in the third lens group.

The positive lens disposed in the third lens group is formed as a double aspherical lens. The object-side lens surface has a negative radius of curvature. The radius of curvature of this object-side lens surface is gradually decreased from the optical axis toward the peripheral area, so that a positive spherical aberration generated in the third lens group is satisfactorily corrected. Moreover, the image-side lens surface of this lens has a negative radius of curvature. The radius of curvature of this image-side lens surface is gradually increased when it becomes away from the optical axis, so as to excellently correct a coma generated in the wide angle end state.

Each of the conditions will be fully described in the following.

The condition (1) defines the configuration of the object-side lens surface of the double aspherical lens which is disposed in the third lens group.

Above the upper limit of the condition (1), the curvature becomes sharply large in the lens peripheral portion. For this reason, a light beam is sharply bent. As a result, the optical performance is conspicuously deteriorated even by slight decentration which may be generated when the lens is assembled. On the contrary, below the lower limit of the condition (1), correction of a coma in the peripheral portion of the frame in the wide angle end state is turned unsatisfactory.

According to the present invention, it is preferable that a lens disposed on the most object side in the first lens group is a cemented positive lens consisting of a positive lens with the convex surface facing the object side and a negative lens with the concave surface facing the object side and that this lens satisfies the following condition (2), in order to reduce the total length of the lens in the telephoto end state and to reduce the size of the camera body:

$$1.5 < |R2|/D2 < 4, \quad (2)$$

where R2 is the radius of curvature of a cemented surface of the cemented positive lens disposed in the first lens group (R2<0), and D2 is the distance from the cemented surface of the cemented positive lens disposed in the first lens group in the telephoto end state to the aperture stop.

In a conventionally known zoom lens system which is disclosed, for example, in Japanese Patent Application Laid-Open No. 8-262325, a negative lens is disposed on the most object side. For this reason, it is difficult to reduce the total length of the lens in the telephoto end state.

According to the present invention, the total length of the lens system is reduced by disposing a positive lens on the most object side. With this arrangement, if the refractive power of the first lens group is enhanced by forming this positive lens as a cemented lens, it is possible to satisfactorily correct a negative spherical aberration which may be generated in the first lens group.

The condition (2) defines the radius of curvature of the cemented surface of the cemented lens in the first lens group.

Above the upper limit of the condition (2), a negative spherical aberration which may be generated in the first lens group can not be correct satisfactorily. Consequently, a predetermined optical performance can not be obtained. On the contrary, below the lower limit of the condition (2), an off-axis light flux passes through a position away from the optical axis in the telephoto end state. For this reason, an off-axial aberration is generated in a large amount so that the predetermined optical performance can not be obtained.

According to the present invention, in order to reduce the size of the lens system further, it is preferable to satisfy the following condition (3):

$$0.25 < f1/ft < 0.4, \quad (3)$$

where f1 is the focal length of the first lens group, and ft is the focal length of the entire variable focal length lens system in the telephoto end state.

The condition (3) defines the focal length of the first lens group.

Above the upper limit of the condition (3), it becomes difficult to further reduce the total length of the lens system in the telephoto end state. On the contrary, below the lower limit of the condition (3), a main light ray passing through the first lens group in the telephoto end state passes largely away from the optical axis. As a result, the lens diameter is increased.

According to the present invention, the second lens group is composed of a cemented negative lens which consists of a negative lens with the concave surface facing the object side and a positive lens, an aperture stop, and a positive lens with the convex surface facing the image side With this arrangement, it is possible to simplify the configuration of the lens system.

Generally, in a lens system with the reduced number of the lens elements, the refractive power of each lens for constituting the lens system is enhanced. However, according to the present invention, it becomes possible, by disposing the aperture stop between the above-mentioned cemented negative lens having a negative refractive power and the positive lens having a positive refractive power, to weaken the refractive powers of the two lenses, and thus simplify the configuration of the lens system.

Particularly, a stable optical quality can be obtained also when the lens system is manufactured, by satisfying the following condition (4):

$$0.75 < (|r21|+|r22|)/f2 < 0.9, \quad (4)$$

where r21 is the radius of curvature of a lens surface on the most object side of the cemented negative lens disposed in the second lens group, r22 is the radius of curvature of a lens surface on the image side of the positive lens disposed in the second lens group, and f2 is the focal length of the second lens group.

The condition (4) defines a ratio between the radius of curvature of the lens surface on the object side of the cemented negative lens disposed in the second lens group and the radius of curvature of the lens surface on the image side of the positive lens.

Above the upper limit of the condition (4), both of the refractive powers of the cemented negative lens and the positive lens are weakened. Consequently, a positive distortion generated in the wide angle end state can not be satisfactorily corrected. On the contrary, below the lower limit of the condition (4), deterioration of the performance due to mutual decentration between the cemented negative lens and the positive lens becomes great. For this reason, it becomes difficult to securely obtain stable optical quality at the manufacturing time.

In each of the embodiments of the present invention, an aspherical lens is disposed in a third lens group. In the wide angle end state, an off-axis light flux passing through the third lens group which is positioned away form the aperture stop passes through the aspherical lens away from the optical axis. Accordingly, the aspherical surface of the aspherical lens is particularly effective for correction of an off-axial aberration.

It should be noted that each of the following embodiments comprises three movable lens groups. However, another lens group may be easily provided additionally between any adjacent lens groups or on an adjacent image side or object side.

Next, description will be made on a variable focal length lens system according to the second aspect of the present invention.

The variable focal length lens system according to the second aspect of the present invention is composed of a first lens group having a positive refractive power, a second lens group having a positive refractive power and a third lens group having a negative refractive power from the object side in this order. Then, when the focal length is changed from a wide angle end state (with the shortest focal length) to a telephoto end state (with the longest focal length), the respective lens groups are moved toward the object side in such a manner that a gap between the first lens group and the second lens group is increased and a gap between the second lens group and the third lens group is decreased. In this variable focal length lens system, at least the first lens group is moved toward the object side in the wide angle end state when a near distance focusing operation is effected. Also, in the telephoto end state, at least first lens group is moved toward the image side when a near distance focusing operation is effected.

Next, the function of each lens group will be described.

The first lens group works to converge a light flux. This first lens group is disposed to a film surface as close as possible in the wide angle end state, so as to prevent an off-axis light flux passing therethrough from passing away from the optical axis. With this arrangement, the lens diameter of the first lens group is reduced. In the telephoto end state, the first lens group is moved toward the object side in such a manner that the gap between the first lens group and the second lens group is largely increased. Thus, the convergence effect is increased to reduce the total length of the lens system.

The second lens group works to further converge a light flux which is converged by the first lens group.

The third lens works to enlarge an image of an object to be photographed which is formed by the first and second lens groups. With the change from the wide angle end state to the telephoto end state, the third lens group is moved toward the object side. With this movement, a ratio of enlargement is increased to change the focal length.

Next, description will be made on correction of a variation in off-axial aberrations caused by a change of the lens positional state.

A position of an aperture stop is important for obtaining a high zooming ratio. Particularly, it is important to provide a large number of lens groups for changing a gap with the aperture stop. According to the present invention, the aperture stop is disposed in the vicinity of the second lens group. Then, it is arranged such that, when the lens positional state is changed, the gap between the first lens group and the third lens group should be positively changed.

The first lens group is arranged to be approximated to the second lens group in the wide angle end state, so that the off-axis light flux passes the optical axis as close as possible. Also, the first lens group is arranged, in the telephoto end state, to have a wide distance from the second lens group so that the off-axis light flux passes away from the optical axis. The height of the off-axis light flux passing through the first lens group is positively changed in this manner. Consequently, a variation of the off-axial aberration caused by a change of the lens positional state is satisfactorily corrected.

The third lens group is arranged to be approximated to the second lens group in the telephoto end state, so that the off-axis light flux passes the optical axis as close as possible. Also, the third lens group is arranged, in the wide angle end state, to have a wide distance from the second lens group so that the off-axis light flux passes away from the optical axis. The height of the off-axis light flux passing through the third lens group is positively changed in this manner. Consequently, a variation of the off-axial aberration caused by a change of the lens positional state is satisfactorily corrected. With the above arrangements, a high performance of the lens system can be sufficiently obtained even with a high zooming ratio, irrespective of lens positional state.

According to the present invention, it is preferable to satisfy, under the above described arrangements, the following conditions (5) and (6):

$$0.2 < \gamma_{3W} < 0.7, \quad (5)$$

and $$1.1 < \gamma_{3t} < 1.5, \quad (6)$$

where $\gamma_{3W}$ is a ratio of an amount of movement of the third lens group with respect to an amount of movement of the first lens group in the wide angle end state, focused at near distance. $\gamma_{3t}$ is a ratio of an amount of movement of the third lens group with respect to an amount of movement of the first lens group in the telephoto end state, focused at near distance (the ratio of an amount of movement of the third lens group with respect to an amount of movement of the first lens group will be hereinafter called the "movement ratio").

The condition (5) defines an appropriate range for the movement ratio in order to reduce the total length of the lens system in the wide angle end state and to obtain an accuracy in stopping of the lens in a good balance. When the movement ratio exceeds the upper limit of the condition (5), an amount of movement of each lens group for the near distance focusing is increased, so as to require a longer time for the focusing. For this reason, there arises a difference in time from a state in which a photographer releases the shutter, thereby giving unpleasant feelings to the photographer. On the contrary, below the lower limit of the condition (5), an amount of movement of the third lens group becomes small, so that a high stopping accuracy is required. In addition, a high stopping accuracy is also required for the first lens group, which complicates the internal structure of the lens barrel.

The condition (6) defines an appropriate range for the movement ratio in order to reduce the total length of the lens system in the telephoto end state and to obtain an accuracy in stopping of the lens in a good balance. When the movement ratio exceeds the upper limit of the condition (6), an amount of movement of each lens group is decreased, so that a high stopping accuracy is required, which complicates the internal structure of the lens barrel. On the contrary, below the lower limit of the condition (6), an amount of movement of each lens required for the near distance focusing becomes large, so as to require a longer time for the focusing.

For example, in the near distance focusing method disclosed in Japanese Patent Application Laid-Open No. 7-151953, it is arranged such that the first lens group is moved toward the object side in the telephoto end state, focused at near distance. For this reason, the total length of the lens system in the telephoto end state is larger than that in the infinity focusing state.

According to the present invention, in the wide angle end state, the first lens group is moved toward the object side when an object a near distance is focused. Also, it is arranged such that the first lens group is moved toward the image side in the telephoto end state. As a result, the total length of the lens system in the telephoto end state focused at near distance is not larger than the total length of the lens system focused at infinity.

According to the present invention, with an arrangement as described above, the problems mentioned above are solved, to thereby realize a high zooming lens system in a small size with a high performance. As a result, it is possible to reduce the total length of the lens system in the telephoto end state.

According to the present invention, it is preferable to constitute the first lens group in a manner as described below, in order to obtain a smaller size and a higher performance of the lens system.

The first lens group is composed of a cemented lens having a positive refractive power. The cemented lens is preferably a cemented positive lens consisting of a positive lens in a double convex form and a negative meniscus lens with the concave surface facing the object side. For example, in the zoom lens system disclosed in Japanese Patent Application Laid-Open No. 2-73211, the negative lens is disposed on the most object side, which is not suitable for reducing the total length of the lens system since the convergence effect thereof is weak. However, according to the present invention, the positive lens in a double convex form is disposed on the object side, whereby the total length of the lens system can be effectively reduced. It is also possible to satisfactorily correct a negative spherical aberration.

Further, in the first lens group, it is preferable to satisfy the following condition (7):

$$0.5 < f_1/(f_t \times f_w)^{1/2} < 0.9, \tag{7}$$

where $f_1$ is the focal length of the first lens group, and $f_w$ is the focal length of the entire variable focal length lens system in the wide angle end state Further, $f_t$ is the focal length of the entire variable focal length lens system in the telephoto end state.

The condition (7) defines an appropriate range for the focal length $f_1$ of the first lens group, in order to achieve compact size and higher performance of the lens system. Above the upper limit of the condition (7), the convergence effect of the first lens group in the telephoto end state becomes weak. For this reason, it becomes difficult to reduce the total length of the lens system in the telephoto end state. On the contrary, below the lower limit of the condition (7), an off-axis light flux passing through the first lens group in the telephoto end state passes away from the optical axis. For this reason, an off-axial aberration can not be satisfactorily corrected, thereby failing to attain higher performance.

According to the present invention, it is preferable to arrange the second lens group in a manner as described below, in order to achieve a more stable quality with a simpler configuration of the lens system.

The second lens group is preferably composed of a cemented negative lens consisting of two lenses, which includes one negative lens and one positive lens, and having a negative refractive power (hereinafter called the negative sub lens group), an aperture stop, and at least one positive lens in a double convex form (hereinafter called the positive sub lens group), form the object side in this order. A layout of the refractive powers in the lens system in the wide angle end state may be as follows, with the arrangement of the above two lens groups. The layout can be close to a symmetrical layout of refractive powers in which the first lens group having a positive refractive power, the negative sub lens group, the aperture stop, the positive sub lens group, and the third lens group having a negative refractive power are disposed from the object side in this order. By being close to this refractive power layout, a positive distortion is satisfactorily corrected.

Then, according to the present invention, it is preferable to satisfy the following condition (8), in order to obtain more higher performance.

$$0.5 < (|f_{2a}| + f_{2b})/f_2 < 2.3, \tag{8}$$

where $f_{2a}$ is the focal length of the negative sub lens group in the second lens group, and $f_{2b}$ is the focal length of the positive sub lens group in the second lens group. Further, $f_2$ is the focal length of the second lens group.

The condition (8) provides a condition for reducing the lens diameter and for obtaining the higher performance in a good balance. Above the upper limit of the condition (8), an off-axis light flux passing through the third lens group passes away from the optical axis, which results in increase of the lens diameter. On the contrary, below the lower limit of the condition (8), the refractive power of the lens group having a negative refractive power and that of the lens group having a positive refractive power are increased, whereby an off-axis light flux passing through this third lens group in the wide angle end state is refracted more strongly, so that an off-axial aberration is generated in a large amount in a peripheral area of the screen.

According to the present invention, it is preferable to arrange the third lens group as follows.

The third lens group is preferably composed of two lenses, which includes a positive lens with the convex surface facing the image side and a negative lens with the concave surface facing the object side, in order to satisfactorily correct an off-axial aberration generated in the third lens group alone, and to further reduce the total length of the lens system. It is possible to achieve reduction of the lens diameter by preventing the off-axis light flux from being converged by the positive lens with the convex surface facing the image side and from moving away from the optical axis. Also, the negative lens with the concave surface facing the object side can suppress off-axial aberration by turning the concave surface thereof to face the aperture stop, that is, to turn the concave surface thereof to face the object side.

Then, according to the present invention, it is preferable to satisfy the following condition (9), in order to obtain more higher performance and to further reduce the size of the lens system in a good balance.

$$1.9 < f_1/|f_3| < 2.8, \tag{9}$$

where $f_1$ is the focal length of the first lens group, and $f_3$ is the focal length of the third lens group.

The condition (9) provides a condition for satisfactorily correcting an off-axial aberration which may be generated in the third lens group alone, and for reducing the total length of the lens system. Above the upper limit of the condition (9), an off-axial aberration is generated in a large amount in the third lens group. On the contrary, below the lower limit of the condition (9), an off-axis light flux passes far away from the optical axis, so that it becomes difficult to further reduce the lens diameter.

Then, according to the present invention, it is preferable to satisfy the following condition (10), in order to correct an off-axial aberration more satisfactorily and to reduce further the total lens of the lens system in the telephoto end state.

$$0.1 < R_a \times N_a/f_t < 0.5, \tag{10}$$

where $R_a$ is the radius of curvature of a surface on the object side of the positive lens having the double convex form in the first lens group. $N_a$ is the refractive index of the positive lens having the double convex form in the first lens group. Further, $f_t$ is the focal length in the telephoto end state Above the upper limit of the condition (10), the position of the principal point of the first lens group moves toward the image side. As a result, it becomes impossible to reduce the total length of the lens system in the telephoto end state. On the contrary, below the lower limit of the condition (10), the convergence effect of the light flux becomes weak, so that the total length of the lens system in the telephoto end state can be reduced. However, since the convergence effect becomes too strong, a negative spherical aberration is generated in a large amount, whereby the off-axial aberration can not be corrected satisfactorily.

Also, according to the present invention, it is preferable to satisfy the following condition (11), in order to correct a positive distortion more satisfactorily in the wide angle end state.

$$1.0<|R_b|/D_a<3.8, \qquad (11)$$

where $R_b$ is the radius of curvature of a surface on the most object side of the negative sub lens group in the second lens group. Also, $D_a$ is a distance on the optical axis from the surface on the most object side of the negative sub lens group in the second lens group to the stop.

The condition (11) defines a condition for correcting a positive distortion which is generated in the wide angle end state, so as to attain a higher performance. Above the upper limit of the condition (11), an off-axis light flux is refracted so as to pass away further from the optical axis. As a result, a positive distortion to be generated in the wide angle end state is generated in a large amount. On the contrary, below the lower limit of the condition (11), a divergence effect becomes strong so that the total length of the lens system in the telephoto end state is increased.

In each of the embodiments of the present invention, aspherical lenses are disposed in the second lens group and the third lens group, respectively. By disposing an aspherical lens in the second lens group, it is possible to correct a negative spherical aberration which is generated in the second lens group alone satisfactorily It is also possible to satisfactorily correct a variation of an axial aberration which is caused by a change of the focal length state. By disposing an aspherical lens in the third lens group, it becomes possible to satisfactorily correct a variation in an axial aberration which is generated when the focal length state is changed from the wide angle end state to the telephoto end state.

Also, in each of the embodiments of the present invention, a lens system is composed of three variable lens groups. However, it is also possible to add another lens group between the above lens groups, or to additionally provide another lens group adjacently to the lens systems on the image side or the object side thereof. For example, it is possible to obtain a higher performance or a higher zoom ratio if a single lens is cemented in such a manner that the positive sub lens group in the second lens group is formed not as a positive lens having a double convex form, but as a cemented positive lens, as in the second embodiment.

Further, in each of the embodiments of the present invention, the second lens group is composed of a cemented negative lens (negative sub lens group) which consists of two lenses, that is, one negative lens and one positive lens, and has a negative refractive power, an aperture stop, and at least one positive lens having a double convex form (a positive sub lens group), from the object side in this order. However, it is possible to add a flare stop adjacently to the image side or the object side of the negative sub lens group and the positive sub lens group. For example, it is possible to form a sharper image by adding a flare stop on the image side of the positive sub lens group in the second lens group, as in the first embodiment and the second embodiment.

Also, according to the present invention, from another point of view, it is possible to constitute the following arrangement to prevent a failure in phototaking due to an image blur caused by a shake of a hand which tends to occur with a high zoom lens. That is, a shake detecting system and a driving means are combined with the lens system. The shape detecting system is to detect a shake of the lens system. The driving means is to decentralize a part or the whole of one lens group, out of the lens groups for constituting the lens system, as a shift lens group. With this arrangement, first a shake of the lens system is detected by the shake detecting system. Then, the shift lens group is decentralized by the driving means so as to correct an image blur (a fluctuation of the image surface position) which is caused by this shake. This decentration of the shift lens group causes the image to shift, so as to correct the image blur. As described above, it is possible to constitute the variable focal length lens system of the present invention as a so-called anti-vibration optical system.

It is possible to apply the zoom lens of the present invention in a camera with a solid image picking element by additionally providing a positive lens group on the most image side of the optical system. This positive lens group may be stationary all the time with respect to a solid image picking element. Also, it is possible, by moving this positive lens group toward the optical axis, to focus an object at near distance or to ease a change of the exit pupil position which is caused in response to a change of the lens position state.

Each of the embodiments according to the present invention will be described below with reference to the drawings. In each embodiment, an aspherical surface is expressed by the following formula:

$$S(y)=(y^2/R)/\{1+(1-\kappa \times y^2/R^2)^{1/2}\}+C_4 \times y^4+C_6 \times y^6+C_8 \times y^8+C_{10} \times y^{10}.$$

where y is the height in a direction perpendicular to the optical axis, and S(y) is a distance (sag amount) from a tangent plane of the vertex of each aspherical surface at the height y to the aspherical surface along the optical axis. Also, R is a fiducial radius of curvature (the radius of curvature of the vertex), κ is a conical constant, and $C_n$ is an n-th order aspherical coefficient.

It should be noted that, in each of the embodiments, the aspherical coefficient $C_2$ of the $2^{nd}$ order is 0. The radius of curvature R of the vertex is coincident with the paraxial radius of curvature r. In addition, an asterisk "*" is given to the right side of the surface number of an aspherical surface.

FIG. 1 is a view for showing a layout of refractive powers in a variable focal length lens system according to each of first to third embodiments of the present invention and a state of movement of each lens group when a focal length state is changed from a wide angle end state (W) to a telephoto end state (T). As shown in FIG. 1, the variable focal length lens system according to each of the first to third embodiments of the present invention is composed of three lens groups which including a first lens group G1 having a positive refractive power, a second lens group G2 having a positive refractive power, and a third lens group G3 having a negative refractive power, from the object side in the order. Then, all of the lens groups are moved toward the object side in such a manner that, when the focal length is changed from the wide angle end state to the telephoto end state, a gap between the first lens group G1 and the second lens group G2 is increased and a gap between the second lens group G2 and the third lens group G3 is decreased.

[First Embodiment]

Figure 2:
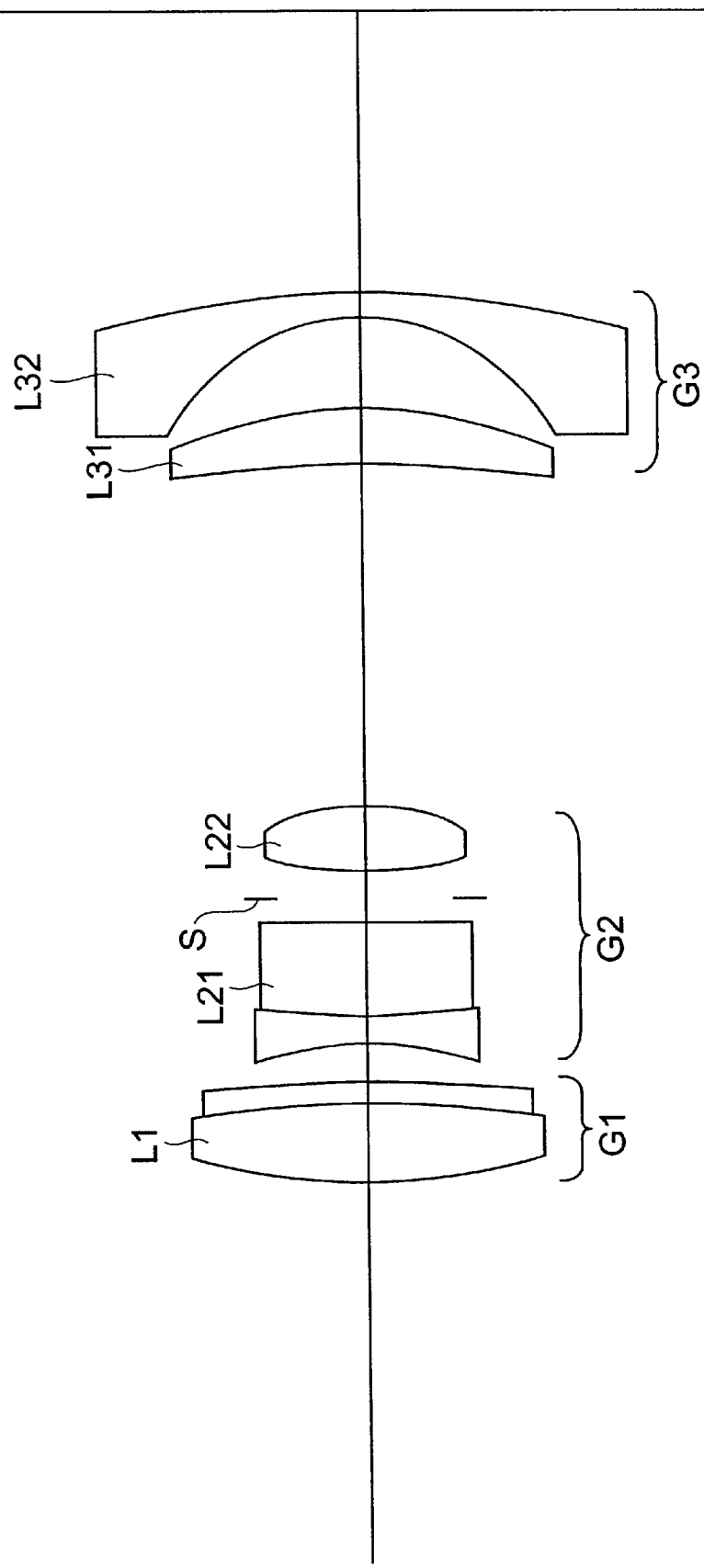
FIG. 2 is a cross-sectional view for showing the configuration of a variable focal length lens system according to a first embodiment of the present invention.

FIG. 2 is a view for showing a configuration of a variable focal length lens system according to the first embodiment of the present invention.

In the variable focal length lens system shown in FIG. 2, the first lens group G1 is composed of a cemented positive lens L1 which consists of, from the object side in the order, a positive lens having a double convex form and a negative meniscus lens with the concave surface facing the object side. The second lens group G2 is composed of a cemented negative lens L21 consisting of a negative lens having a double concave form and a convex lens and a positive lens L22 having a double convex form, from the object side in the order. Further, the third lens group G3 is composed of a positive lens L31 with the convex surface facing the image side and a negative lens L32 which is disposed on the image side of the positive lens L31 with an air space therebetween and which has the concave surface facing the object side.

As described above, in the first embodiment, the cemented negative lens L21 forms a negative sub group, while the positive lens group L22 forms a positive sub group. Then, an aperture stop is disposed between the cemented negative lens L21 and the positive lens L22.

The following Table 1 shows values for the specifications in the first embodiment according to the present invention. In this table, f denotes a focal length, FNO an F number, 2ω an angle of view, and Bf a back focal length, respectively. A surface number indicates the order of a lens surface from the object side along the direction in which a light beam advances. Furthermore, a refractive index and an Abbe number respectively indicate the values for the line d (λ=587.6 nm). In addition, the radius of curvature of 0.0000 indicates a flat plane.

It should be noted that for the specifications of all of the following embodiments, the same referential symbols and numerals as those in the present embodiment are employed.

Generally, the focal length f, the radius of curvature r, the distance between the surfaces d, and others, shown in all of the following specifications are expressed in "mm". However, the units usable in the present invention are not limited to this, since substantially the same optical performance can be obtained even when the optical system is proportionally enlarged or proportionally reduced.

TABLE 1

(General Specifications)

|  | Wide angle end state | Intermediate focal length state | Telephoto end state |
|---|---|---|---|
| f | 39.90 ~ | 75.15 ~ | 142.50 |
| F NO | 5.92 ~ | 9.72 ~ | 13.55 |
| 2 ω | 55.15 ~ | 31.24 ~ | 16.92° |

(Lens Data)

| Surface Number | Radius of curvature | Distance between the surfaces | Refractive index | Abbe number |
|---|---|---|---|---|
| 1 | 24.0681 | 3.15 | 1.49700 | 81.61 |
| 2 | −61.4150 | 0.80 | 1.79504 | 28.39 |
| 3 | −164.9100 | (D3) | 1.0 | |
| 4 | −15.2863 | 1.20 | 1.83400 | 37.17 |
| 5 | 34.1970 | 3.90 | 1.76182 | 26.52 |
| 6 | −121.8747 | 1.00 | 1.0 | |
| 7 | 0.0000 | 0.95 | 1.0 (aperture stop) | |
| 8 | 23.4343 | 2.10 | 1.51450 | 63.05 |
| 9* | −13.2664 | (D10) | 1.0 | |
| 10* | −39.0983 | 2.20 | 1.68893 | 31.16 |
| 11* | −22.2285 | 3.70 | 1.0 | |
| 12 | −9.2035 | 1.00 | 1.75500 | 52.32 |
| 13 | −44.6504 | (Bf) | 1.0 | |

(Aspherical Coefficient)

In the present embodiment, the lens surfaces of Surface No. 9, No. 10 and No. 11 are aspherical. The aspherical coefficients of these lens surfaces are as described below.

[Surface No. 9]
κ=1.4723
$C_4$=+1.3090×10$^{-4}$ $C_6$=+3.7192×10$^{-7}$
$C_8$=−7.4944×10$^{-9}$ $C_{10}$=+3.2574×10$^{-10}$

[Surface No. 10]
κ=5.6917
$C_4$=+9.6941×10$^{-5}$ $C_6$=+5.2325×10$^{-8}$
$C_8$=+1.6179×10$^{-8}$ $C_{10}$=−2.0236×10$^{-10}$

[Surface No. 11]
κ=6.5000
$C_4$=+5.6189×10$^{-5}$ $C_6$=+9.8677×10$^{-7}$
$C_8$=−5.3246×10$^{-9}$ $C_{10}$=+4.5028×10$^{-11}$ (Variable Distance Data)

Variable distances when the focal length is changed are as follows.

|  | Wide angle end state | Intermediate focal length state | Telephoto end state |
|---|---|---|---|
| f | 39.8980 | 75.1461 | 142.5002 |
| D3 | 1.6294 | 6.9543 | 16.0671 |
| D10 | 14.2924 | 7.0722 | 0.6500 |
| BF | 11.2992 | 34.8735 | 69.2829 |

(Values for the Above Conditions)

In the following, values for the above conditions of the present embodiment are shown.

DA=15.9992, DS=35.5416 f1=48.5793, f2=35.6049

$$\kappa a(Ya/Ra)^2=1.244 \tag{1}$$

(κa=κ of the surface No. 11)

$$|R2|/D2=2.674 \tag{2}$$

$$f1/ft=0.341 \tag{3}$$

$$(|r21|+|r22|)/f2=0.802 \tag{4}$$

FIGS. 3A through 3D, 3E through 3H, and 3I through 3L are aberration graphs for showing aberrations when an object at infinity is focused according to the first embodiment of the present invention, respectively showing aberrations in the wide angle end state (f=39.90 mm), in the intermediate focal length state (f=75.15 mm), and in the telephoto end state (f=142.50 mm).

In each of the aberration graphs in FIGS. 3A through 3L, the solid line in the spherical aberration graph indicates a spherical aberration, the broken line indicates a sine condition, and Y denotes the image height, respectively. In the astigmatism graph, the solid line indicates a sagittal image plane, the broken line indicates a meridional image plane, and d denotes an aberration relative to the line d, respectively. The coma graphs show comas at the height Y=0, 10.8, 15.12, 18.34, and 21.6. A indicates an angle of view. Note that in the following aberration graphs for the second and third embodiments, the same referential symbols and numerals as those in the present embodiment are used.

From the above aberration graphs, it is clearly seen that the aberrations are satisfactorily corrected in the present embodiment and an excellent image formation performance can be obtained.

[Second Embodiment]

FIG. 4 is a view for showing a configuration of a variable focal length lens system according to the second embodiment of the present invention.

In the variable focal length lens system shown in FIG. 4, the first lens group G1 is composed of a cemented positive lens L1 which consists of a positive lens having a double convex form and a negative meniscus lens with the concave surface facing the object side. The second lens group G2 is composed of a cemented negative lens L21 consisting of a negative lens having a double concave form and a convex lens and a positive lens L22 having a double convex form, from the object side in the order. Further, the third lens group G3 is composed of a positive lens L31 with the convex surface facing the image side and a negative lens L32 which is disposed on the image side of the positive lens L31 with an air space therebetween and which has the concave surface facing the object side.

As described above, in the second embodiment, the cemented negative lens L21 forms a negative sub group, while the positive lens group L22 forms a positive sub group. Then, an aperture stop is disposed between the cemented negative lens L21 and the positive lens L22.

The following Table 2 shows values for the specifications in the second embodiment according to the present invention.

TABLE 2

(General Specifications)

|  | Wide angle end state | Intermediate focal length state | Telephoto end state |
|---|---|---|---|
| f | 39.90 | ~ 69.39 | ~ 123.50 |
| F NO | 5.75 | ~ 8.83 | ~ 11.97 |
| 2 ω | 55.20 | ~ 33.46 | ~ 19.37° |

(Lens Data)

| Surface Number | Radius of curvature | Distance between the surfaces | Refractive index | Abbe number |
|---|---|---|---|---|
| 1 | 23.1391 | 2.90 | 1.49700 | 81.61 |
| 2 | -42.5480 | 0.80 | 1.67270 | 32.11 |
| 3 | -146.3675 | (D3) | 1.0 | |
| 4 | -16.2509 | 1.35 | 1.83481 | 42.72 |
| 5 | 33.0140 | 1.65 | 1.62004 | 36.26 |
| 6 | -45.8980 | 2.85 | 1.0 | |
| 7 | 0.0000 | 1.00 | 1.0 (aperture stop) | |
| 8 | 26.6530 | 2.10 | 1.51450 | 63.05 |
| 9* | -14.3813 | (D10) | 1.0 | |
| 10* | -91.5327 | 2.30 | 1.68893 | 31.16 |
| 11* | -27.0000 | 3.55 | 1.0 | |
| 12 | -9.3994 | 1.00 | 1.80400 | 46.58 |
| 13 | -63.6912 | (Bf) | 1.0 | |

(Aspherical Coefficient)

In the present embodiment, the lens surfaces of Surface No. 9, No. 10 and No. 11 are aspherical. The aspherical coefficients of these lens surfaces are as described below.

[Surface No. 9]

$\kappa = -4.000$ $C_4 = -1.3843 \times 10^{-4}$  $C_6 = +3.5389 \times 10^{-6}$ $C_8 = -1.8648 \times 10^{-7}$  $C_{10} = +4.8390 \times 10^{-9}$

[Surface No. 10]

$\kappa = +7.8116$ $C_4 = +5.2068 \times 10^{-5}$  $C_6 = +6.4858 \times 10^{-7}$ $C_8 = -2.1377 \times 10^{-8}$  $C_{10} = +1.8295 \times 10^{-10}$

[Surface No. 11]

$\kappa = +7.6000$ $C_4 = -4.3957 \times 10^{-6}$  $C_6 = +1.1262 \times 10^{-6}$ $C_8 = -3.0775 \times 10^{-8}$  $C_{10} = +1.4259 \times 10^{-10}$ (Variable Distance Data)

Variable distances when the focal length is changed are as follows.

|  | Wide angle end state | Intermediate focal length state | Telephoto end state |
|---|---|---|---|
| f | 39.9006 | 69.3874 | 123.5027 |
| D3 | 1.8284 | 6.3386 | 14.0438 |
| D10 | 13.5003 | 7.0141 | 0.9000 |
| BF | 11.1740 | 30.1340 | 57.5576 |

(Values for the Above Conditions)

In the following, values for the above conditions of the present embodiment are shown.

DA=15.7240, DS=34.6243 f1=45.6884, f2=36.7109

$\kappa a (Ya/Ra)^2 = 1.003$ (1)

($\kappa a = \kappa$ of the surface No. 11)

$|R2|/D2 = 2.112$ (2)

$f1/ft = 0.370$ (3)

$(|r21| + |r22|)/f2 = 0.834$ (4)

FIGS. 5A through 5D, 5E through 5H, and 5I through 5L are aberration graphs for showing aberrations when an object at infinity is focused according to the second embodiment of the present invention, respectively showing aberrations in the wide angle end state (f=39.90 mm), in the intermediate focal length state (f=69.39 mm), and in the telephoto end state (f=123.50 mm).

From the above aberration graphs, it is clearly seen that the aberrations are satisfactorily corrected in the present embodiment and an excellent image formation performance can be obtained.

[Third Embodiment]

Figure 6:
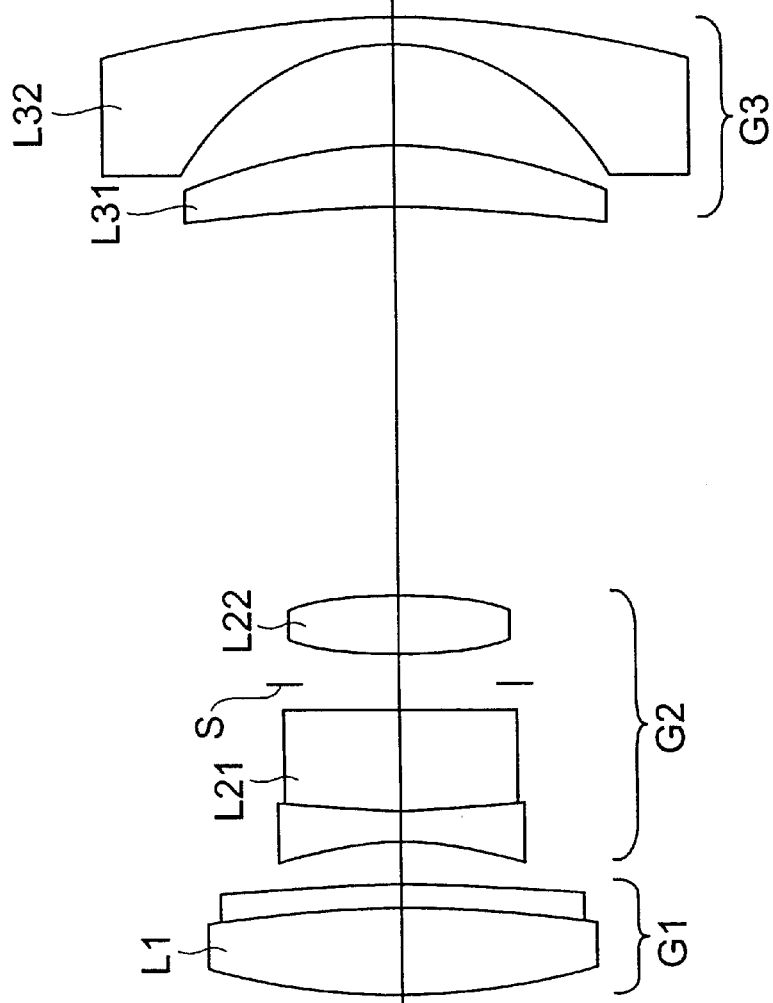
FIG. 6 is a cross-sectional view for showing the configuration of a variable focal length lens system according to a third embodiment of the present invention.

FIG. 6 is a view for showing a configuration of a variable focal length lens system according to the third embodiment of the present invention. In the variable focal length lens system shown in FIG. 6, the first lens group G1 is composed of a cemented positive lens L21 which consists of a positive lens having a double convex form and a negative meniscus lens with the concave surface facing the object side. The second lens group G2 is composed of a cemented negative lens L21 consisting of a negative lens having a double concave form and a convex lens and a positive lens L22 having a double convex form, from the object side in the order. Further, the third lens group G3 is composed of a positive lens L31 with the convex surface facing the image side and a negative lens L32 which is disposed on the image side of the positive lens L31 with an air space therebetween and which has the concave surface facing the object side.

As described above, in the third embodiment, the cemented negative lens L21 forms a negative sub group, while the positive lens group L22 forms a positive sub group. Then, an aperture stop is disposed between the cemented negative lens L21 and the positive lens L22.

The following Table 3 shows values for the specifications in the third embodiment according to the present invention.

TABLE 3

(General Specifications)

|   | Wide angle end state | Intermediate focal length state | Telephoto end state |
|---|---|---|---|
| f | 39.90 ~ | 74.99 ~ | 142.50 |
| F NO | 5.86 ~ | 9.61 ~ | 13.56 |
| 2 ω | 55.20 ~ | 31.33 ~ | 16.95° |

(Lens Data)

| Surface Number | Radius of curvature | Distance between the surfaces | Refractive index | Abbe number |
|---|---|---|---|---|
| 1 | 23.9451 | 3.15 | 1.49700 | 81.61 |
| 2 | −72.4270 | 0.80 | 1.79504 | 28.39 |
| 3 | −264.0005 | (D3) | 1.0 | |
| 4 | −15.6751 | 1.20 | 1.83481 | 42.72 |
| 5 | 75.6270 | 3.90 | 1.67270 | 32.11 |
| 6 | −101.0923 | 1.00 | 1.0 | |
| 7 | 0.0000 | 0.95 | 1.0 (aperture stop) | |
| 8 | 22.4174 | 2.10 | 1.51450 | 63.05 |
| 9* | −13.8917 | (D10) | 1.0 | |
| 10* | −52.6837 | 2.20 | 1.68893 | 31.16 |
| 11* | −26.2400 | 3.80 | 1.0 | |
| 12 | −9.2997 | 1.00 | 1.75500 | 52.32 |
| 13 | −46.8296 | (Bf) | 1.0 | |

(Aspherical Coefficient)

In the present embodiment, the lens surfaces of Surface No. 9, No. 10 and No. 11 are aspherical. The aspherical coefficients of these lens surfaces are as described below.

[Surface No. 9]
$\kappa = +3.2420$
$C_4 = +2.0325 \times 10^{-4}$  $C_6 = +1.6085 \times 10^{-6}$
$C_8 = -5.5776 \times 10^{-9}$  $C_{10} = +4.9353 \times 10^{-10}$

[Surface No. 10]
$\kappa = +5.3324$
$C_4 = +6.1457 \times 10^{-5}$  $C_6 = +2.9353 \times 10^{-6}$
$C_8 = -6.5818 \times 10^{-8}$  $C_{10} = +4.6523 \times 10^{-10}$

[Surface No. 11]
$\kappa = +7.0000$
$C_4 = +4.3238 \times 10^{-6}$  $C_6 = +3.4855 \times 10^{-6}$
$C_8 = -6.6017 \times 10^{-8}$  $C_{10} = +3.2782 \times 10^{-10}$ (Variable Distance Data)

Variable distances when the focal length is changed are as follows.

|   | Wide angle end state | Intermediate focal length state | Telephoto end state |
|---|---|---|---|
| f | 39.9005 | 74.9923 | 142.5030 |
| D3 | 1.6584 | 7.2400 | 16.7920 |
| D10 | 14.1127 | 9.6223 | 0.6500 |
| BF | 11.3260 | 34.5698 | 68.4594 |

(Values for the Above Conditions)

In the following, values for the above conditions of the present embodiment are shown.

DA=16.1260, DS=35.4886
f1=50.8185, f2=34.8921

$$\kappa a(Ya/Ra)^2 = 0.979 \quad (1)$$

($\kappa a = \kappa$ of the surface No. 11)

$$|R2|/D2 = 3.057 \quad (2)$$

$$f1/ft = 0.357 \quad (3)$$

$$(|r21| + |r22|)/f2 = 0.847 \quad (4)$$

FIGS. 7A through 7D, 7E through 7H, and 7I through 7L are aberration graphs for showing aberrations when an object at infinity is focused according to the third embodiment of the present invention, respectively showing aberrations in the wide angle end state (f=39.90 mm), in the intermediate focal length state (f=74.99 mm), and in the telephoto end state (f=142.50 mm).

From the above aberration graphs, it is clearly seen that the aberrations are satisfactorily corrected in the present embodiment and an excellent image formation performance can be obtained.

Figure 8:
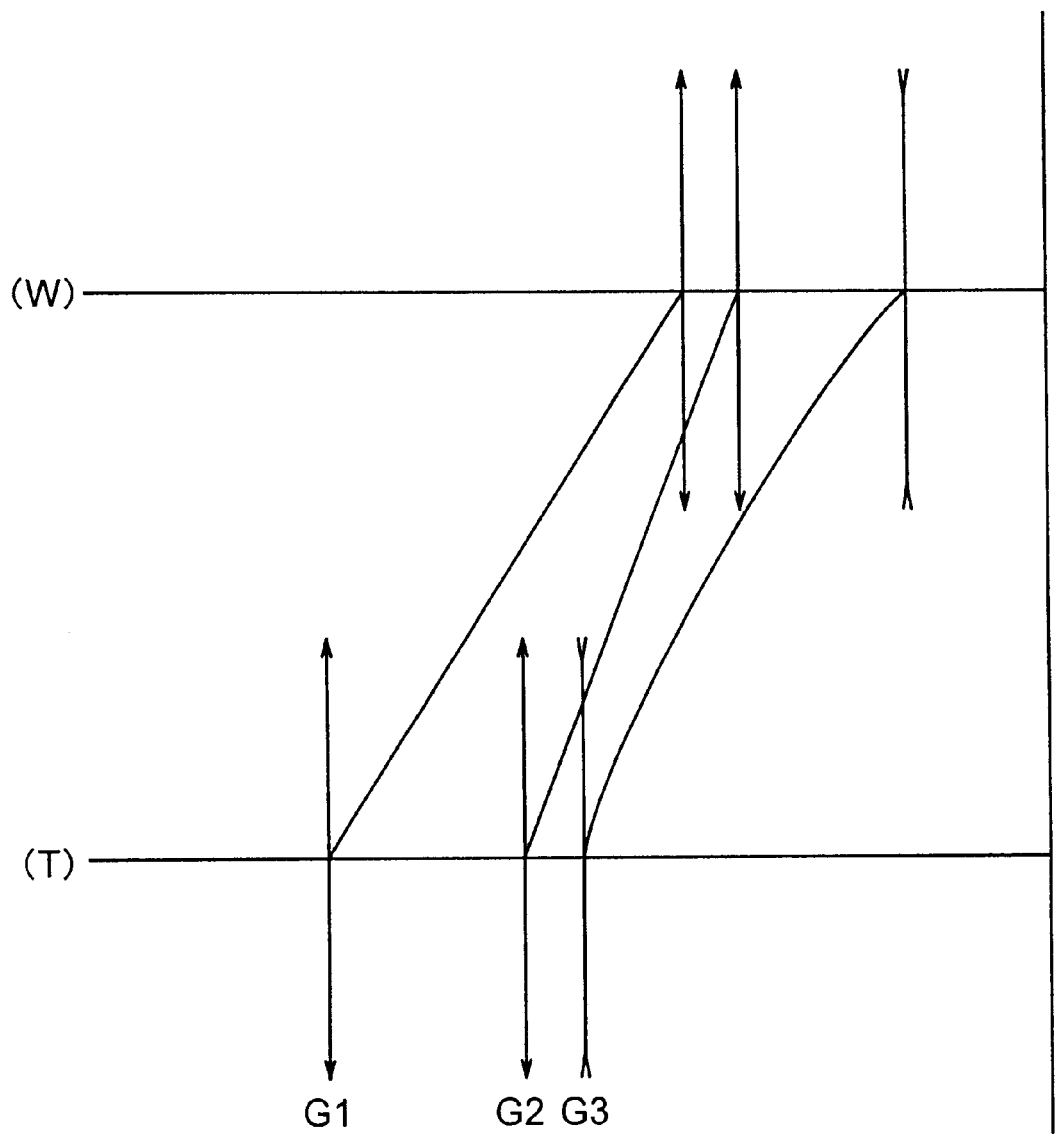
FIG. 8 is a graph for showing a layout of refractive power of a variable focal length lens system according to each embodiment of the second aspect of the present invention and for showing a state of movement of each lens group in the course of change of the focal length state from the wide angle end state (W) to the telephoto end state (T).

FIG. 8 is a view for showing a layout of refractive powers of a variable focal length lens system according to each of fourth to seventh embodiments of the present invention and a state of movement of each lens group when a focal length state is changed from the wide angle end state (W) to the telephoto end state (T). As shown in FIG. 8, the variable focal length lens system according to each of the fourth to seventh embodiments of the present invention is composed of three lens groups, consisting of a first lens group G1 having a positive refractive power, a second lens group G2 having a positive refractive power, and a third lens group G3 having a negative refractive power, from the object side in the order. Then, all of the first lens group G1, the second lens group G2 and the third lens group G3 are moved toward the object side in such a manner that, when the focal length is changed from the wide angle end state to the telephoto end state, that is, when a zooming operation is conducted, a gap between the first lens group G1 and the second lens group G2 is increased and a gap between the second lens group G2 and the third lens group G3 is decreased.

[Fourth Embodiment]

Figure 9:
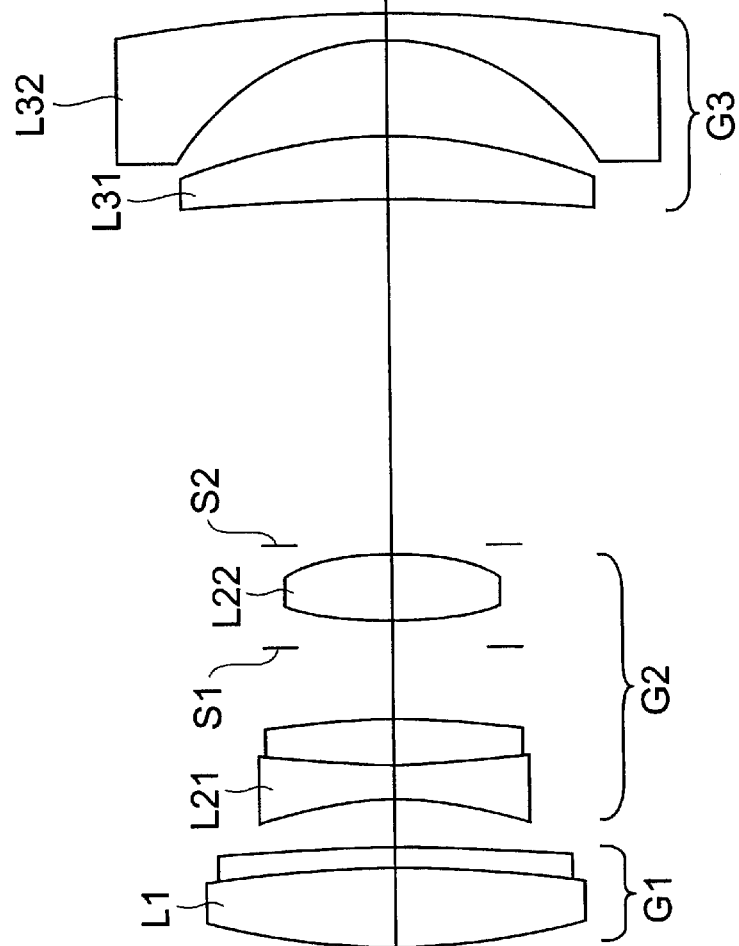
FIG. 9 is a cross-sectional view for showing the configuration of a variable focal length lens system according to a fourth embodiment of the present invention.

FIG. 9 is a view for showing a configuration of a variable focal length lens system according to the fourth embodiment of the present invention.

In the variable focal length lens system shown in FIG. 9, the first lens group G1 is composed of a cemented positive lens L1 which consists of, from the object side in the order, a positive lens having a double convex form and a negative meniscus lens with the concave surface facing the object side bonded together. The second lens group G2 is composed of a cemented negative lens L21 consisting of a negative lens having a double concave form and a positive lens having a double convex form bonded together and a positive lens L22 having a double convex form with the image-side surface formed aspherical, from the object side in the order. Further, the third lens group G3 is composed of a positive meniscus lens L31 which has the object-side surface and the image-side surface both formed aspherical and which has the concave surface facing the object side and a negative meniscus lens L32 with the concave surface facing the object side, from the object side in the order.

An aperture stop S1 is disposed between the cemented negative lens L21 in the second lens group G2 and the positive lens L22 having a double convex form. A flare stop S2 is disposed on the image side of the positive lens L22 having a double convex form. The aperture stop S1 and the flare stop S2 are moved together with the second lens group G2 in a zooming from the wide angle end state to the telephoto end state.

As described above, according to the fourth embodiment, in the second lens group G2, the cemented negative lens L21 forms a negative sub lens group, while the positive lens group L22 forms a positive sub lens group.

The following Table 4 shows values for the specifications in the fourth embodiment according to the present invention.

TABLE 4

(General Specifications)

|  | Wide angle end state | | Intermediate focal length state | | Telephoto end state |
|---|---|---|---|---|---|
| f | 39.90 | ~ | 81.81 | ~ | 123.50 |
| F NO | 5.74 | ~ | 9.81 | ~ | 11.98 |
| 2 ω | 55.18 | ~ | 28.71 | ~ | 19.36 |

(Lens Data)

| Surface Number | Radius of curvature | Distance between the surfaces | Refractive index | Abbe number |
|---|---|---|---|---|
| 1 | 23.2943 | 2.80 | 1.49700 | 81.61 |
| 2 | −42.3960 | 0.80 | 1.67270 | 32.11 |
| 3 | −144.4834 | (d3) | | |
| 4 | −15.7429 | 1.25 | 1.83481 | 42.72 |
| 5 | 30.6340 | 1.60 | 1.62004 | 36.26 |
| 6 | −45.2733 | 2.65 | | |
| 7 | 0.0000 | 1.00 (aperture stop S1) | | |
| 8 | 25.9836 | 2.20 | 1.51450 | 63.05 |
| 9* | −13.8869 | 0.10 | | |
| 10 | 0.0000 | (d10) (flare stop S2) | | |
| 11* | −89.3279 | 2.30 | 1.68893 | 31.16 |
| 12* | −26.9718 | 3.60 | | |
| 13 | −9.2997 | 1.00 | 1.80400 | 46.58 |
| 14 | −59.7582 | (Bf) | | |

(Aspherical Coefficient)

In the present embodiment, the lens surfaces of Surface No. 9, No. 11 and No. 12 are aspherical. Data of each aspherical surface including of the radius of curvature R of the vertex, the conical constant κ, and the aspherical coefficients $C_4$ to $C_{10}$ are as described below.

[Surface No. 9]

R=−13.8869

κ=−1.8225

$C_4$=−5.2595×$10^{-5}$ $C_6$=2.5053×$10^{-6}$ $C_8$=−1.9230×$10^{-7}$ $C_{10}$=5.4444×$10^{-9}$

[Surface No. 11]

R=−89.3279

κ=−9.0000

$C_4$=5.5733×$10^{-5}$ $C_6$=1.4444×$10^{-7}$ $C_8$=−3.4156×$10^{-11}$ $C_{10}$=−4.6939×$10^{-11}$

[Surface No. 12]

R=−26.9718

κ=9.7109

$C_4$=1.1916×$10^{-5}$ $C_6$=1.0025×$10^{-6}$ $C_8$=−2.1225×$10^{-8}$ $C_{10}$=1.3722×$10^{-10}$ (Variable Distance Data)

An axial air distance d3 between the first lens group G1 and the second lens group G2, an axial air distance d10 between the second lens group G2 and the third lens group G3, and the back focal length Bf are changed in zooming. Variable distances at the, respective focal lengths, that is, in the wide angle end state, in the intermediate focal length state and in the telephoto end state are shown in the following.

|  | Wide angle end state | Intermediate focal length state | Telephoto end state |
|---|---|---|---|
| f | 39.9007 | 81.8141 | 123.5028 |
| d3 | 2.2046 | 8.5849 | 14.3349 |
| d10 | 13.2667 | 5.1310 | 0.8000 |
| Bf | 11.1723 | 37.1314 | 57.5245 |

(Amount and Ratio of Movement of the Lens Groups when an Object at Near Distance is Focused)

In the following, there are shown an amount of movement $\Delta_1$ of the first lens group, an amount of movement $\Delta_2$ of the second lens group, an amount of movement $\Delta_3$ of the third lens group, a ratio of movement $\gamma_2$ of the amount of movement of the second lens group with respect to the amount of movement of the first lens group, and a ratio of movement $\gamma_3$ of the amount of movement of the third lens group with respect to the amount of movement of the first lens group when an object at near distance is focused (in a focusing state with the photographing distance of 0.8 m).

|  | Wide angle end state | Intermediate focal length state | Telephoto end state |
|---|---|---|---|
| f | 39.9007 | 81.8141 | 123.5028 |
| $\Delta_1$ | 1.5163 | 2.5078 | −3.7325 |
| $\Delta_2$ | 1.1166 | 1.8467 | −2.7486 |
| $\Delta_3$ | 0.5611 | 1.0649 | −4.9458 |
| $\gamma_2$ | 0.7364 | 0.7364 | 0.7364 |
| $\gamma_3$ | 0.3700 | 0.4246 | 1.3251 |

Note that a movement of the lens groups toward the object side is considered as positive.

(Value for the Above Conditions)

$f_1$=45.8963

$f_2$=36.3719

$f_3$=−19.8265

$f_{2a}$=−22.0819

$f_{2b}$=17.9261

$\gamma_{3w}$=0.3700 (1)

$\gamma_{3t}$=1.3251 (2)

$f_1/(f_t \times f_w)^{1/2}$=0.654 (3)

$(|f_{2a}|+f_{2b})/f_2$=1.100 (4)

$f_1/|f_3|$=2.315 (5)

$R_a \times N_a/f_t$=0.2824 (6)

$|R_b|/D_a$=1.9679 (7)

FIGS. 10A through 11L are aberration graphs for showing aberrations of the present embodiment with respect to the line d (λ=587.6 nm).

FIGS. 10A through 10D, 10E through 10H, and 10I through 10L are aberration graphs for showing aberrations when an object at infinity is focused according to the fourth embodiment of the present invention, respectively showing aberrations in the wide angle end state (f=39.90 mm), in the intermediate focal length state (f=81.81 mm), and in the telephoto end state (f=123.50 mm).

FIGS. 11A through 11D, 11E through 11H, and 11I through 11L are aberration graphs for showing aberrations when an object at near distance is focused (with a photographing distance of 0.8 m) according to the fourth embodiment of the present invention, respectively, showing aberrations in the wide angle end state (f=39.90 mm), in the intermediate focal length state (f=81.81 mm), and in the telephoto end state (f=123.50 mm).

In each of the aberration graphs in FIGS. 10A through 11L, FNO denotes an F number, Y the image height, A a half angle of view with respect to each image height, and H the height of the object, respectively. Also in the graphs for showing astigmatism, the solid line indicates a sagittal image plane and the broken line indicates a meridional image plane. In the graphs for showing spherical aberration, the solid line indicates a spherical aberration and the broken line indicates a sine condition.

Note that in the following aberration graphs for the fifth to seventh embodiments, the same referential symbols and numerals as those in the present embodiment are used.

From the above aberration graphs, it is clearly seen that the aberrations in all of the focal length states from the wide angle end state to the telephoto end state are satisfactorily corrected in the fourth embodiment and an excellent image formation performance can be obtained.

[Fifth Embodiment]

Figure 12:
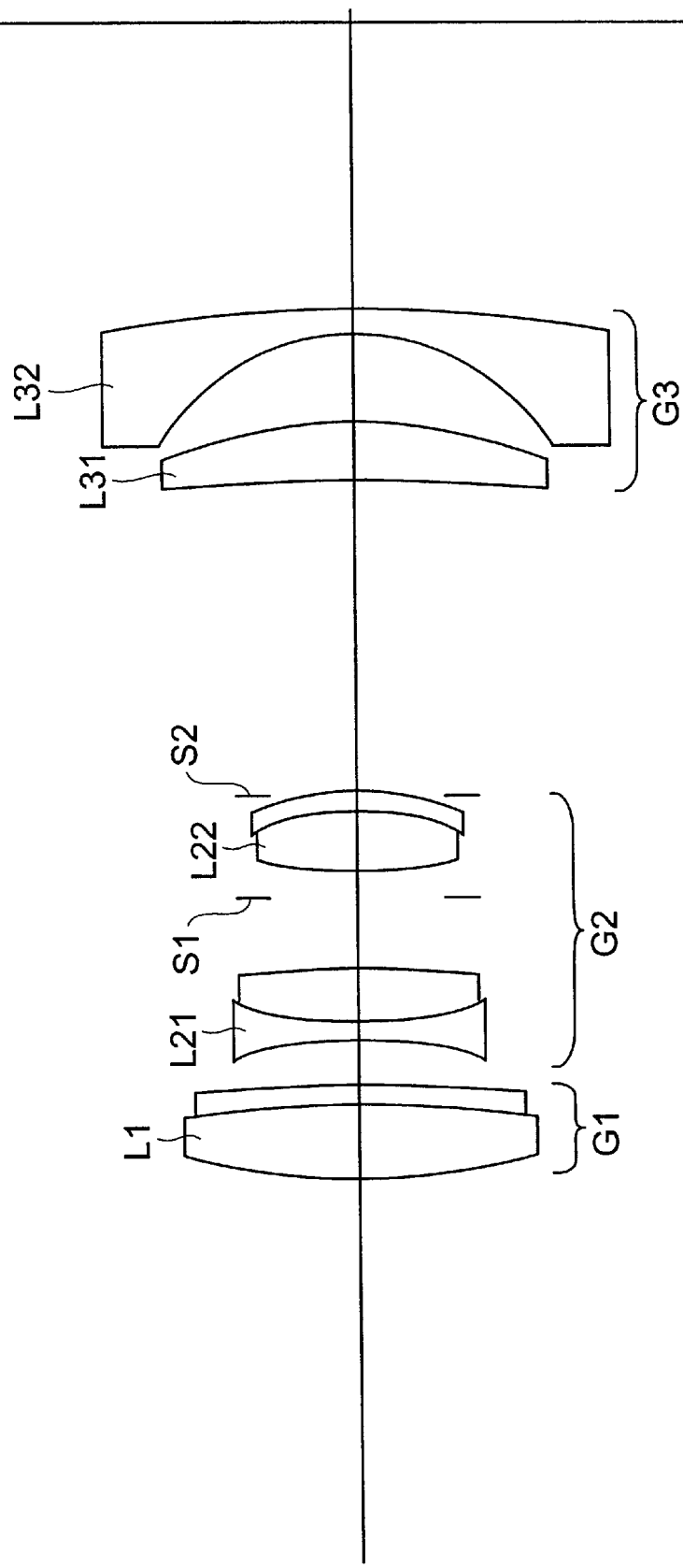
FIG. 12 is a cross-sectional view for showing the configuration of a variable focal length lens system according to a fifth embodiment of the present invention.
Figure 13A:
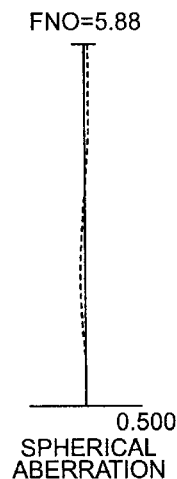
FIGS. 13A through 13D, 13E through 13H, and 13I through 13L are graphs for showing aberrations in the wide angle end state, the intermediate focal length state and the telephoto end state, respectively, focused at infinity according to the fifth embodiment.
Figure 13B:
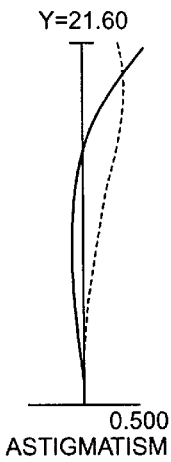
Figure 13C:
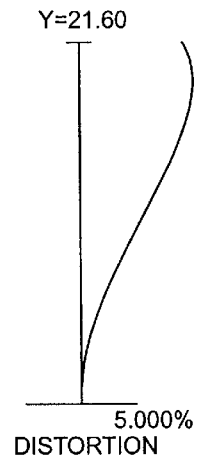
Figure 13D:
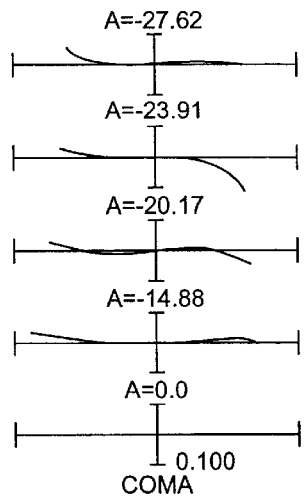
Figure 13E:
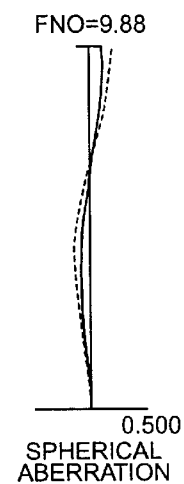
Figure 13F:
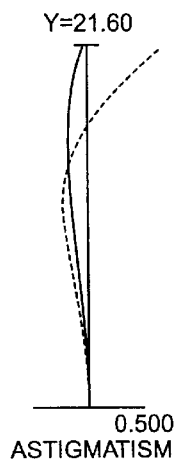
Figure 13G:
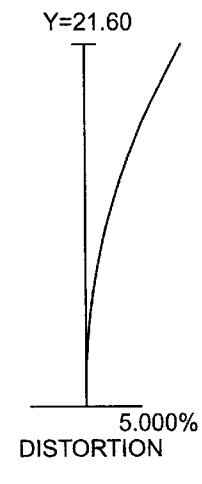
Figure 13H:
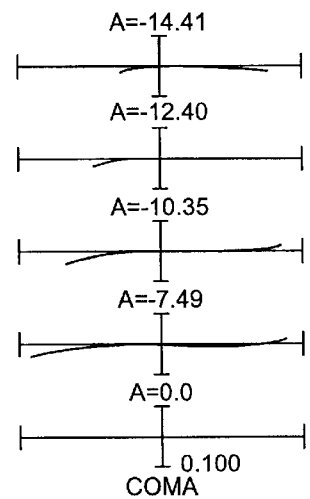
Figure 13I:
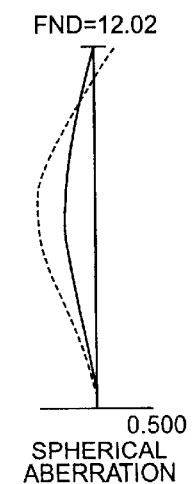
Figure 13J:
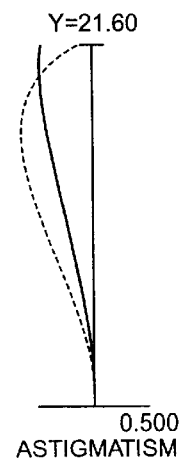
Figure 13K:
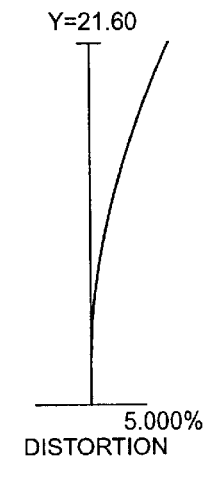
Figure 13L:
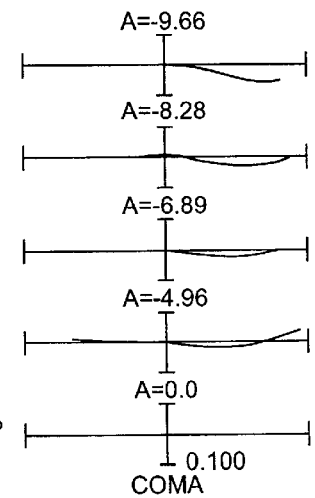
Figure 14A:
FIGS. 14A through 14D, 14E through 14H, and 14I through 14L are graphs for showing aberrations in the wide angle end state, the intermediate focal length state and the telephoto end state, respectively, focused at near distance according to the fifth embodiment.
Figure 14B:
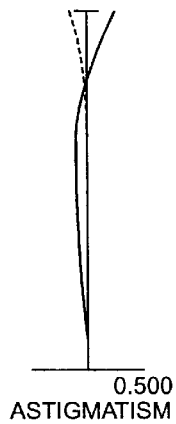
Figure 14C:
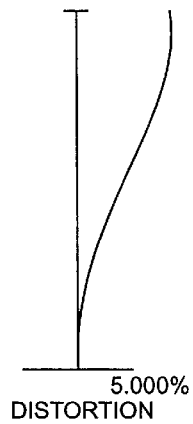
Figure 14D:
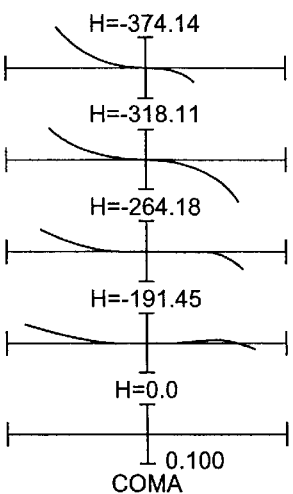
Figure 14E:
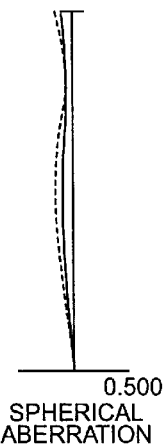
Figure 14F:
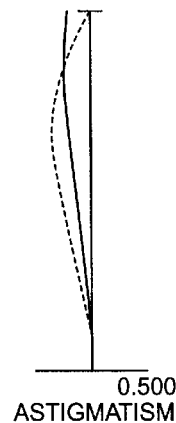
Figure 14G:
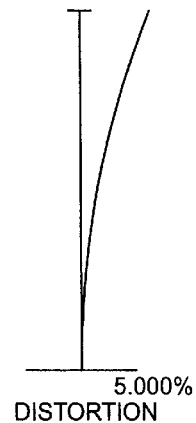
Figure 14H:
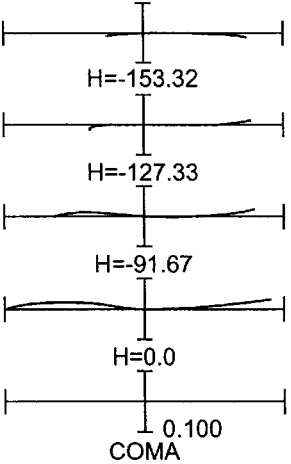
Figure 14I:
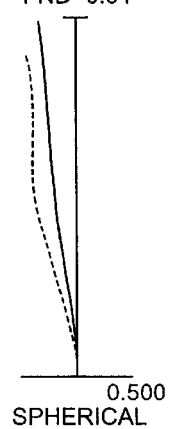
Figure 14J:
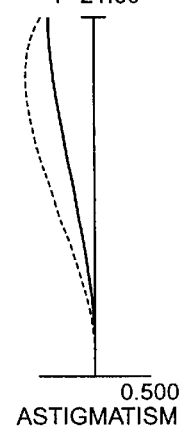
Figure 14K:
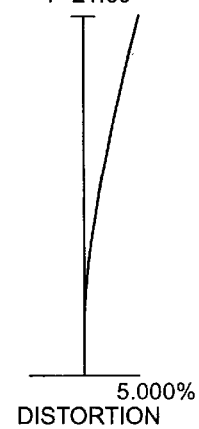
Figure 14L:
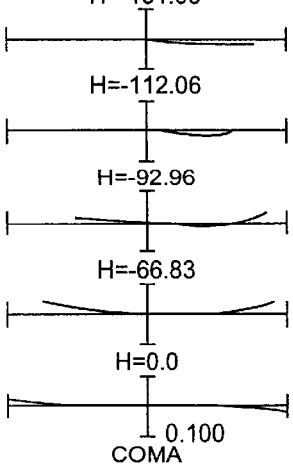

FIG. 12 is a view for showing a configuration of a variable focal length lens system according to the fifth embodiment of the present invention.

In the variable focal length lens system shown in FIG. 12, the first lens group G1 is composed of a cemented positive lens L1 which consists of, from the object side in the order, a positive lens having a double convex form and a negative meniscus lens with the concave surface facing the object side bonded together. The second lens group G2 is composed of a cemented negative lens L21 consisting of a negative lens having a double concave form and a positive lens having a double convex form bonded together, and a cemented positive lens L22 consisting of a positive lens having a double convex form and a negative meniscus lens bonded together, from the object side in the order. It should be noted that the cemented positive lens has the concave surface facing the object side and the surface on the image side thereof is formed aspherical. Further, the third lens group G3 is composed of a positive meniscus lens L31 in which both the object-side surface and the image-side surface are aspherical and which has the concave surface facing the object side and a negative meniscus lens L32 with the concave surface facing the object side, from the object side in the order.

An aperture stop S1 is disposed between the cemented negative lens L21 in the second lens group G2 and the cemented positive lens L22. A flare stop S2 is disposed on the image side of the cemented positive lens L22. The aperture stop S1 and the flare stop S2 are moved together with the second lens group G2 in a zooming from the wide angle end state to the telephoto end state.

As described above, according to the second embodiment, in the second lens group G2, the cemented negative lens L21 forms a negative sub lens group, while the cemented positive lens group L22 forms a positive sub lens group.

The following Table 5 shows values for the specifications in the fifth embodiment according to the present invention.

TABLE 5

(General Specifications)

| | Wide angle end state | | Intermediate focal length state | | Telephoto end state |
|---|---|---|---|---|---|
| f | 39.90 | ~ | 81.45 | ~ | 123.50 |
| F NO | 5.88 | ~ | 9.88 | ~ | 12.02 |
| 2 ω | 55.24 | ~ | 28.81 | ~ | 19.32 |

(Lens Data)

| Surface Number | Radius of curvature | Distance between the surfaces | Refractive index | Abbe number |
|---|---|---|---|---|
| 1 | 23.0717 | 2.80 | 1.49700 | 81.61 |
| 2 | −35.4061 | 0.80 | 1.72825 | 28.46 |
| 3 | −87.2408 | (d3) | | |
| 4 | −18.6240 | 0.80 | 1.83481 | 42.72 |
| 5 | 14.3957 | 2.40 | 1.69895 | 30.13 |
| 6 | −74.4365 | 3.25 | | |
| 7 | 0.0000 | 1.00 (aperture stop S1) | | |
| 8 | 24.4694 | 2.35 | 1.49700 | 81.61 |
| 9 | −8.5451 | 0.80 | 1.69350 | 53.31 |
| 10* | −12.2060 | 0.10 | | |
| 11 | 0.0000 | (d11) (flare stop S2) | | |
| 12* | −100.0000 | 2.35 | 1.68893 | 31.16 |
| 13* | −30.6295 | 4.00 | | |
| 14 | −9.3877 | 1.00 | 1.75500 | 52.32 |
| 15 | −80.8230 | (Bf) | | |

(Aspherical Coefficient)

In the present embodiment, the lens surfaces of Surface No. 10, No. 12 and No. 13 are aspherical. Data of each aspherical surface including the radius of curvature R of the vertex, the conical constant κ, and the aspherical coefficients $C_4$ to $C_{10}$ are as described below.

[Surface No. 10]

R=−12.2060

κ=−1.4985

$C_4 = -1.2547 \times 10^{-4}$  $C_6 = 1.0894 \times 10^{-6}$ $C_8 = -7.0719 \times 10^{-8}$  $C_{10} = 1.6096 \times 10^{-9}$

[Surface No. 12]

R=−100.0000

κ=−9.0000

$C_4 = 4.9076 \times 10^{-5}$  $C_6 = -6.0663 \times 10^{-8}$ $C_8 = -1.6348 \times 10^{-8}$  $C_{10} = 1.6326 \times 10^{-10}$

[Surface No. 13]

R=−30.6295

κ=11.0000

$C_4 = -2.2953 \times 10^{-7}$  $C_6 = 6.7909 \times 10^{-7}$ $C_8 = -3.1145 \times 10^{-8}$  $C_{10} = 1.9213 \times 10^{-10}$ (Variable Distance Data)

An axial air distance d3 between the first lens group G1 and the second lens group G2, an axial air distance d11 between the second lens group G2 and the third lens group G3, and the back focal length Bf are changed in zooming. Variable distances at the respective focal lengths, that is, in the wide angle end state, in the intermediate focal length state and in the telephoto end state are shown in the following.

|  | Wide angle end state | Intermediate focal length state | Telephoto end state |
|---|---|---|---|
| f | 39.8996 | 81.4460 | 123.4990 |
| d3 | 1.3000 | 7.5808 | 13.2412 |
| d11 | 13.1511 | 4.9841 | 0.4000 |
| Bf | 11.3138 | 36.6501 | 56.7082 |

(Amount and Ratio of Movement of the Lens Groups at the Near Distance Focusing)

In the following, there are shown an amount of movement $\Delta_1$ of the first lens group, an amount of movement $\Delta_2$ of the second lens group, an amount of movement $\Delta_3$ of the third lens group, a ratio of movement $\gamma_2$ of the amount of movement of the second lens group with respect to the amount of movement of the first lens group, and a ratio of movement $\gamma_3$ of the amount of movement of the third lens group with respect to the amount of movement of the first lens group when an object at near distance is focused (in a focusing state with the photographing distance of 0.8 m).

|  | Wide angle end state | Intermediate focal length state | Telephoto end state |
|---|---|---|---|
| f | 39.8996 | 81.4460 | 123.4990 |
| $\Delta_1$ | 1.4691 | 2.4120 | −3.6170 |
| $\Delta_2$ | 1.0756 | 1.7659 | −2.6482 |
| $\Delta_3$ | 0.5335 | 1.0147 | −4.8949 |
| $\gamma_2$ | 0.7321 | 0.7321 | 0.7322 |
| $\gamma_3$ | 0.3631 | 0.4207 | 1.3533 |

Note that movement of the lens groups toward the object side is considered as positive.
(Value for the Above Conditions)

$f_1$=43.0560

$f_2$=36.2133

$f_3$=−19.5592

$f_{2a}$=−22.6497

$f_{2b}$=18.8303

$\gamma_{3w}$=0.3631 (1)

$\gamma_{3t}$=1.3533 (2)

$f_1/(f_t \times f_w)^{1/2}$=0.613 (3)

$(|f_{2a}|+f_{2b})/f2$=1.145 (4)

$f_1/|f_3|$=2.201 (5)

$R_a \times N_a/f_t$=0.2797 (6)

$|R_b|/D_a$=2.8874 (7)

FIGS. 13A through 14L are aberration graphs for showing aberrations of the present embodiment with respect to the line d ($\lambda$=587.6 nm).

FIGS. 13A through 13D, 13E through 13H, and 13I through 13L are aberration graphs for showing aberrations when an object at infinity is focused according to the fifth embodiment of the present invention, respectively showing aberrations in the wide angle end state (f=39.90 mm), in the intermediate focal length state (f=81.45 mm), and in the telephoto end state (f=123.50 mm).

FIGS. 14A through 14D, 14E through 14H, and 14I through 14L are aberration graphs for showing aberrations when an object at near distance is focused (with the photographing distance of 0.8 m) according to the fifth embodiment of the present invention, respectively showing aberrations in the wide angle end state (f=39.90 mm), in the intermediate focal length state (f=81.45 mm), and in the telephoto end state (f=123.50 mm).

From the above aberration graphs, it is clearly seen that the aberrations in all of the focal length states from the wide angle end state to the telephoto end state are satisfactorily corrected in the fifth a embodiment and an excellent image formation performance can be obtained.

[Sixth Embodiment]

Figure 15:
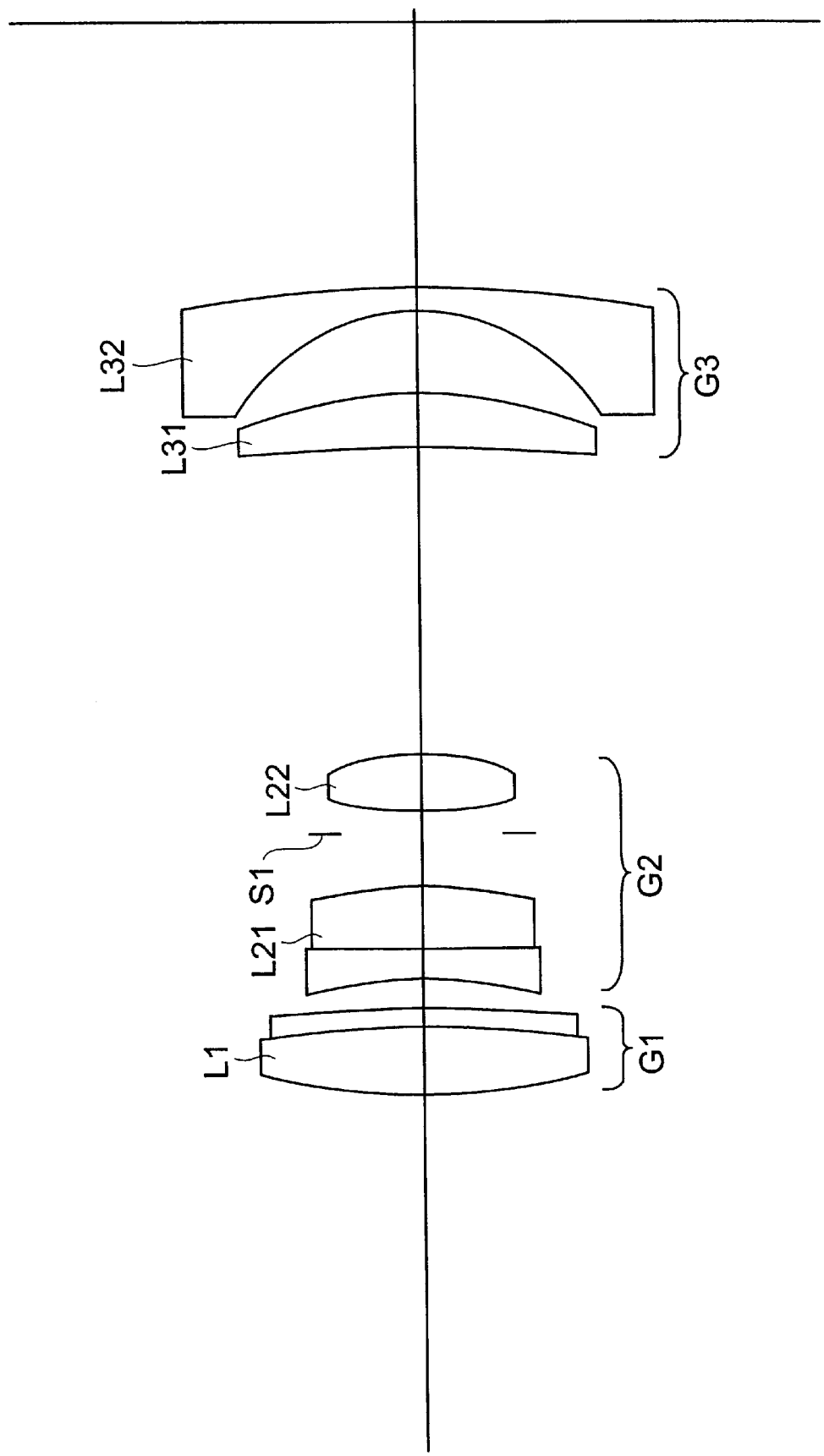
FIG. 15 is a cross-sectional view for showing the configuration of a variable focal length lens system according to a sixth embodiment of the present invention.
Figure 16A:
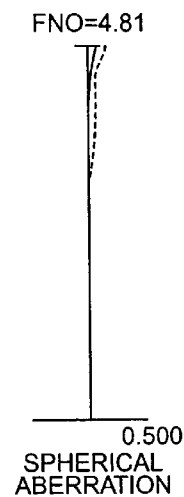
FIGS. 16A through 16D, 16E through 16H, and 16I through 16L are graphs for showing aberrations in the wide angle end state, the intermediate focal length state and the telephoto end state, respectively, focused at infinity according to the sixth embodiment.
Figure 16B:
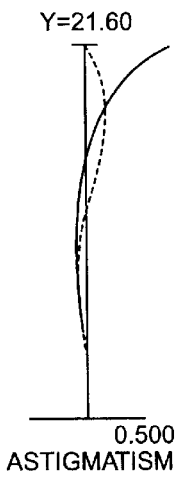
Figure 16C:
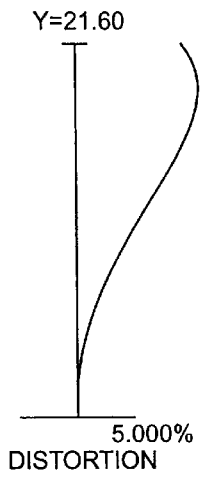
Figure 16D:
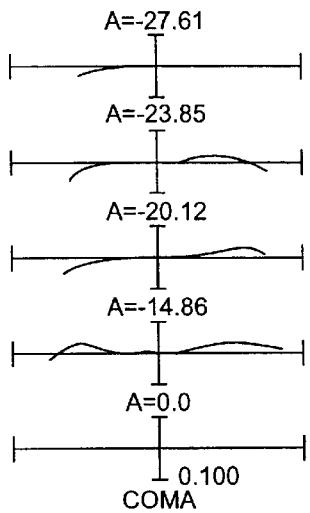
Figure 16E:
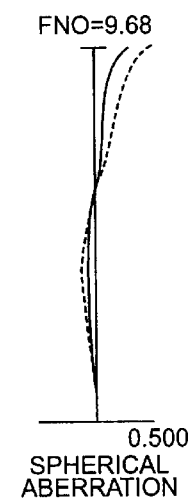
Figure 16F:
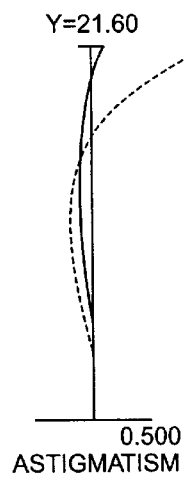
Figure 16G:
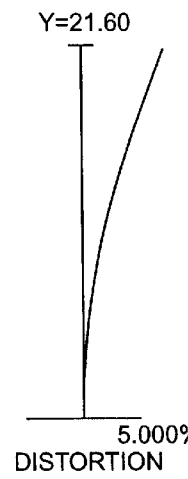
Figure 16H:
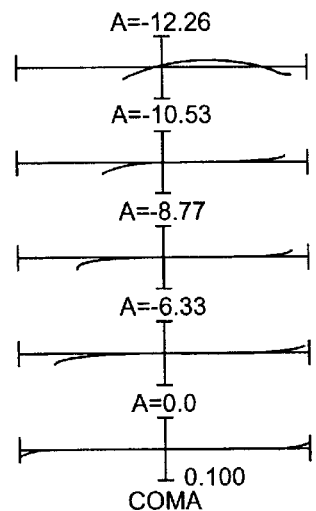
Figure 16I:
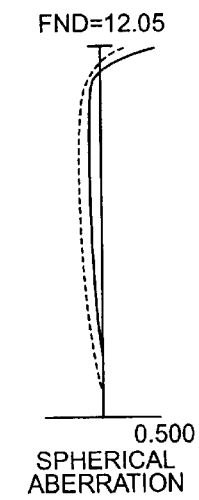
Figure 16J:
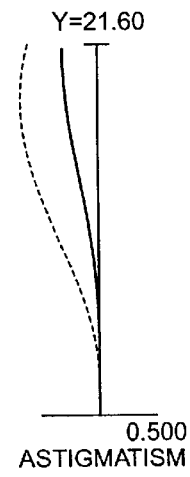
Figure 16K:
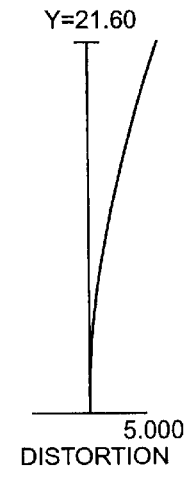
Figure 16L:
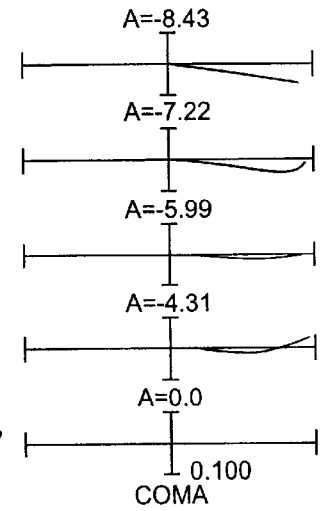

FIG. 15 is a view for showing a configuration of a variable focal length lens system according to the sixth embodiment of the present invention.

In the variable focal length lens system shown in FIG. 15, the first lens group G1 is composed of a cemented positive lens L1 which consists of, from the object side in the order, a positive lens having a double convex form and a negative meniscus lens with the concave surface facing the object side bonded together. The second lens group G2 is composed of a cemented negative lens L21 which consists of a negative meniscus lens with the concave surface facing the object side and a positive meniscus lens with the concave surface facing the object side bonded together, and a cemented positive lens L22 having a double convex form with the object-side surface and the image-side surface both formed to be aspherical, from the object side in the order. Further, the third lens group G3 is composed of a positive meniscus lens L31 in which both the object-side surface and the image-side surface are formed aspherical and which has the concave surface facing the object side and a negative meniscus lens L32 with the concave surface facing the object side, from the object side in the order.

An aperture stop S1 is disposed between the cemented negative lens L21 in the second lens group G2 and the positive lens L22 having the double convex form. The aperture stop S1 is moved together with the second lens group G2 in a zooming from the wide angle end state to the telephoto end state.

As described above, according to the sixth embodiment, in the second lens group G2, the cemented negative lens L21 forms a negative sub lens group, while the positive lens group L22 having the double convex form forms a positive sub lens group.

The following Table 6 shows values for the specifications in the sixth embodiment according to the present invention.

TABLE 6

(General Specifications)

|  | Wide angle end state |  | Intermediate focal length state |  | Telephoto end state |
|---|---|---|---|---|---|
| f | 39.90 | ~ | 96.71 | ~ | 142.50 |
| F NO | 4.81 | ~ | 9.68 | ~ | 12.05 |
| 2 ω | 55.22 | ~ | 24.51 | ~ | 16.86 |

(Lens Data)

| Surface Number | Radius of curvature | Distance between the surfaces | Refractive index | Abbe number |
|---|---|---|---|---|
| 1 | 34.1152 | 3.05 | 1.49700 | 81.61 |
| 2 | −38.8093 | 0.80 | 1.64769 | 33.80 |
| 3 | −87.9852 | (d3) |  |  |
| 4 | −16.0834 | 0.80 | 1.83481 | 42.72 |
| 5 | −109.4293 | 2.55 | 1.57501 | 41.49 |

TABLE 6-continued

| 6 | −25.9862 | 4.25 | | |
|---|---|---|---|---|
| 7 | 0.0000 | 1.00 | (aperture stop S1) | |
| 8* | 43.0909 | 2.10 | 1.51450 | 63.05 |
| 9* | −17.4891 | (d9) | | |
| 10* | −98.1684 | 2.50 | 1.68893 | 31.16 |
| 11* | −27.5042 | 3.55 | | |
| 12 | −11.2732 | 1.00 | 1.80400 | 46.58 |
| 13 | −172.7671 | (Bf) | | |

(Aspherical Coefficient)

In the present embodiment, the lens surfaces of Surface No. 8, No. 9, No. 10, and No. 11 are formed aspherical. Data of each aspherical surface including the radius of curvature R of the vertex, the conical constant κ, and the aspherical coefficients $C_4$ to $C_{10}$ are as described below.

[Surface No. 8]
R=43.0909
κ=4.2765
$C_4$=3.8346×10$^{-5}$  $C_6$=2.0445×10$^{-6}$
$C_8$=−9.3991×10$^{-8}$  $C_{10}$=1.9801×10$^{-9}$

[Surface No. 9]
R=−17.4891
κ=−0.1783
$C_4$=5.3079×10$^{-5}$  $C_6$=2.6706×10$^{-6}$
$C_8$=−1.3420×10$^{-7}$  $C_{10}$=2.7919×10$^{-9}$

[Surface No. 10]
R=−98.1684
κ=−7.5543
$C_4$=4.4155×10$^{-5}$  $C_6$=1.2498×10$^{-6}$
$C_8$=−2.4458×10$^{-8}$  $C_{10}$=1.3426×10$^{-10}$

[Surface No. 11]
R=−27.5042
κ=−8.0674
$C_4$=−7.0080×10$^{-5}$  $C_6$=1.5460×10$^{-6}$
$C_8$=−2.6280×10$^{-8}$  $C_{10}$=9.2325×10$^{-11}$ (Variable Distance Data)

An axial air distance d3 between the first lens group G1 and the second lens group G2, an axial air distance d9 between the second lens group G2 and the third lens group G3, and the back focal length Bf are changed in zooming. Variable distances at the respective focal lengths, that is, in the wide angle end state, in the intermediate focal length state and in the telephoto end state are shown in the following.

| | Wide angle end state | Intermediate focal length state | Telephoto end state |
|---|---|---|---|
| f | 39.9000 | 96.7139 | 142.4997 |
| d3 | 1.3000 | 9.2905 | 15.2593 |
| d9 | 15.2466 | 4.6500 | 0.8000 |
| Bf | 10.4580 | 48.2075 | 72.3404 |

(Amount and Ratio of Movement of the Lens Groups at the Near Distance Focusing)

In the following, there are shown an amount of movement $\Delta_1$ of the first lens group, an amount of movement $\Delta_2$ of the second lens group, an amount of movement $\Delta_3$ of the third lens group, a ratio of movement $\gamma_2$ of the amount of movement of the second lens group with respect to the amount of movement of the first lens group, and a ratio of movement $\gamma_3$ of the amount of movement of the third lens group with respect to the amount of movement of the first lens group when an object at near distance is focused (in a focusing state with the photographing distance of 0.8 m)

| | Wide angle end state | Intermediate focal length state | Telephoto end state |
|---|---|---|---|
| f | 39.9000 | 96.7139 | 142.4997 |
| $\Delta_1$ | 1.8982 | 3.4243 | −5.1496 |
| $\Delta_2$ | 1.4666 | 2.6457 | −3.9787 |
| $\Delta_3$ | 0.6644 | 1.4040 | −6.6944 |
| $\gamma_2$ | 0.7726 | 0.7726 | 0.7726 |
| $\gamma_3$ | 0.3500 | 0.4100 | 1.3000 |

Note that movement of the lens groups toward the object side is considered as positive.

(Value for the Above Conditions)
$f_1$=55.8504
$f_2$=37.8824
$f_3$=−22.4152
$f_{2a}$=−39.8784
$f_{2b}$=24.4671

$\gamma_{3w}$=0.3500 (1)

$\gamma_{3t}$=1.3000 (2)

$f_1/(f_t \times f_w)^{1/2}$=0.741 (3)

$(|f_{2a}|+f_{2b})/f_2$=1.699 (4)

$f_1/|f_3|$=2.492 (5)

$R_a \times N_a/f_t$=0.3584 (6)

$|R_b|/D_a$=2.1162 (7)

FIGS. 16A through 17L are aberration graphs for showing aberrations of the present embodiment with respect to the line d (λ=587.6 nm).

FIGS. 16A through 16D, 16E through 16H, and 16I through 16L are aberration graphs for showing aberrations when an object at infinity is focused according to the sixth embodiment of the present invention, respectively showing aberrations in the wide angle end state (f=39.90 mm), in the intermediate focal length state (f=96.71 mm), and in the telephoto end state (f=142.50 mm).

FIGS. 17A through 17D, 17E through 17H, and 17I through 17L are aberration graphs for showing aberrations when an object at near distance is focused (with the photographing distance of 0.8 m) according to the sixth embodiment of the present invention, respectively showing aberrations in the wide angle end state (f=39.90 mm), in the intermediate focal length state (f=96.71 mm), and in the telephoto end state (f=142.50 mm).

From the above aberration graphs, it is clearly seen that the aberrations in all of the focal length states from the wide angle end state to the telephoto end state are satisfactorily corrected in the sixth embodiment and an excellent image formation performance can be obtained.

[Seventh Embodiment]

Figure 18:
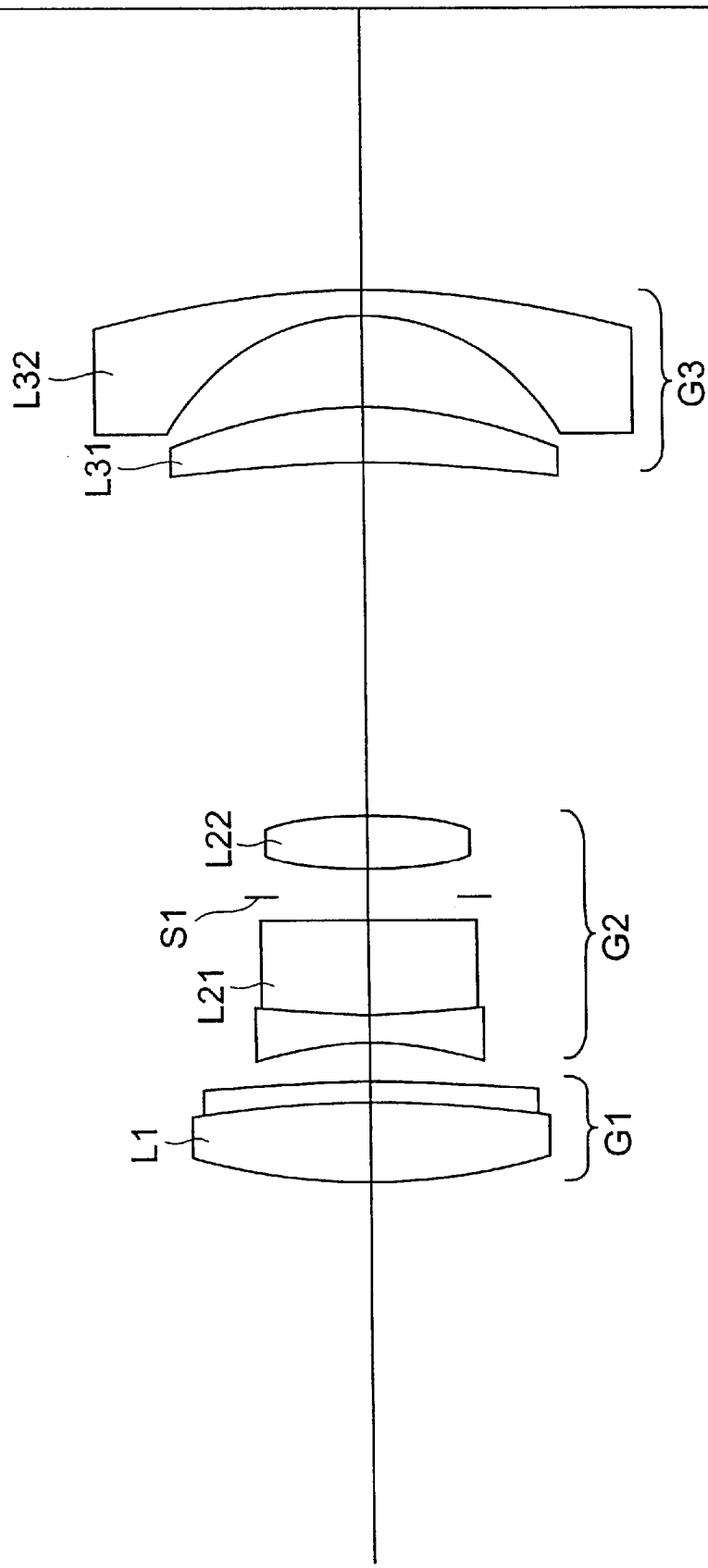
FIG. 18 is a cross-sectional view for showing the configuration of a variable focal length lens system according to a seventh embodiment of the present invention.
Figure 20A:
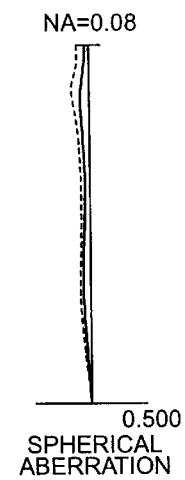
FIGS. 20A through 20D, 20E through 20H, and 20I through 20L are graphs for showing aberrations in the wide angle end state, the intermediate focal length state and the telephoto end state, respectively, focused at near distance according to the seventh embodiment.
Figure 20B:
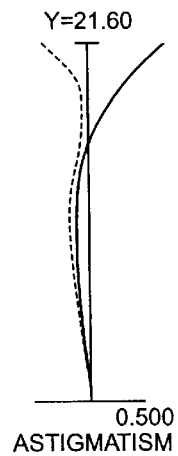
Figure 20C:
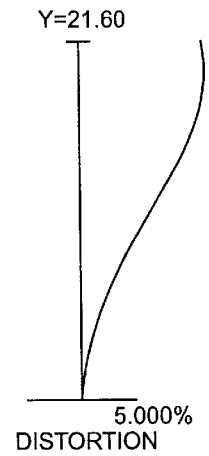
Figure 20D:
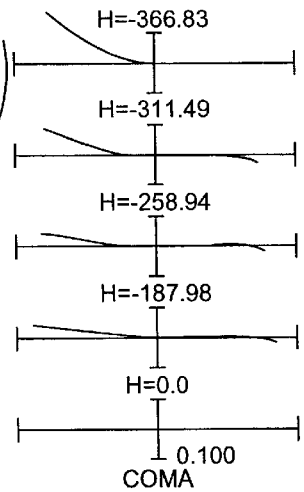
Figure 20E:
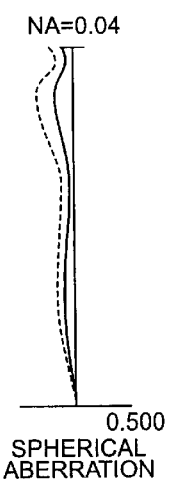
Figure 20F:
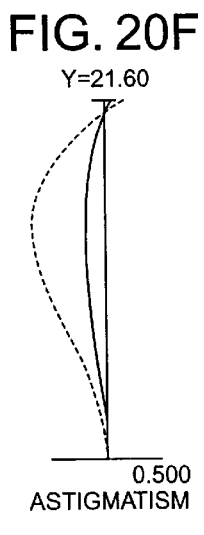
Figure 20G:
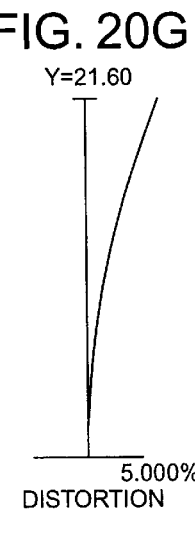
Figure 20H:
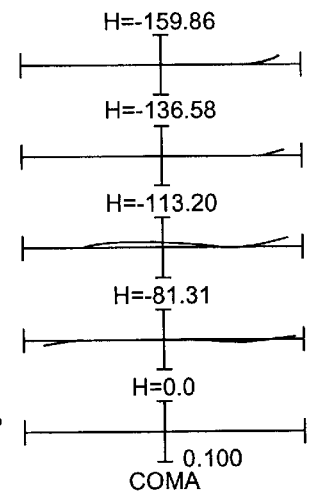
Figure 20I:
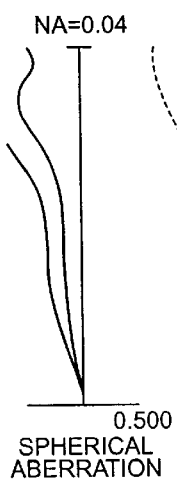
Figure 20J:
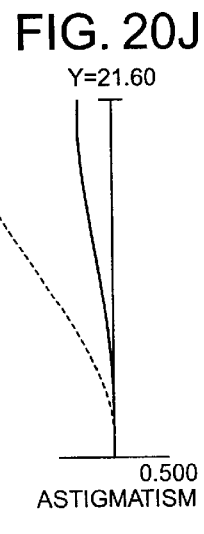
Figure 20K:
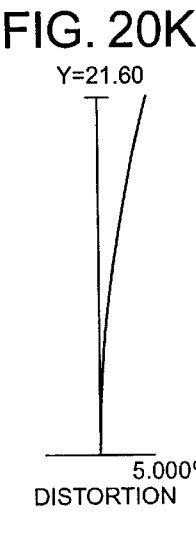
Figure 20L:
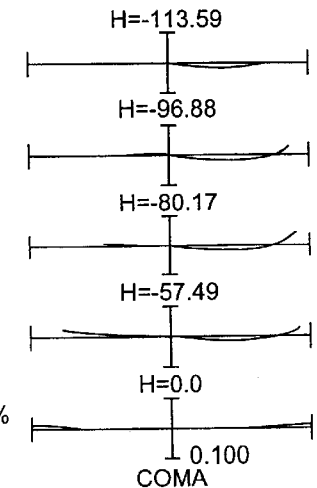

FIG. 18 is a view for showing a configuration of a variable focal length lens system according to the seventh embodiment of the present invention.

In the variable focal length lens system shown in FIG. 18, the first lens group G1 is composed of a cemented positive lens L1 which consists of, from the object side in the order, a positive lens having a double convex form and a negative meniscus lens with the concave surface facing the object side bonded together. The second lens group G2 is composed of a cemented negative lens L21 which consists of a negative lens having a double concave form and a positive lens having a double convex form bonded together, and a positive lens L22 having a double convex form with the image-side surface formed to be aspherical, from the object side in the order. Further, the third lens group G3 is composed of a positive meniscus lens L31 in which both the object-side surface and the image-side surface are formed aspherical and which has the concave surface facing the object side and a negative meniscus lens L32 with the concave surface facing the object side, from the object side in the order.

An aperture stop S1 is disposed between the cemented negative lens L21 in the second lens group G2 and the cemented positive lens L22 having the double convex form. The aperture stop S1 is moved together with the second lens group G2 in a zooming from the wide angle end state to the telephoto end state.

As described above, according to the seventh embodiment, in the second lens group G2, the cemented negative lens L21 forms a negative sub lens group, while the positive lens group L22 having the double convex form forms a positive sub lens group.

The following Table 7 shows values for the specifications in the seventh embodiment according to the present invention.

TABLE 7

(General Specifications)

| | Wide angle end state | Intermediate focal length state | Telephoto end state |
|---|---|---|---|
| f | 39.90 | ~ 90.39 | ~ 142.50 |
| F NO | 5.90 | ~ 10.66 | ~ 13.54 |
| 2ω | 55.19 | ~ 26.29 | ~ 16.96 |

(Lens Data)

| Surface Number | Radius of curvature | Distance between the surfaces | Refractive index | Abbe number |
|---|---|---|---|---|
| 1 | 23.9925 | 3.15 | 1.49700 | 81.61 |
| 2 | −73.4054 | 0.80 | 1.79504 | 28.39 |
| 3 | −276.2215 | (d3) | | |
| 4 | −15.6725 | 1.20 | 1.83481 | 42.72 |
| 5 | 75.6936 | 3.90 | 1.67270 | 32.11 |
| 6 | −108.8275 | 1.00 | | |
| 7 | 0.0000 | 1.00 | (aperture stop S1) | |
| 8 | 22.0920 | 2.00 | 1.51450 | 63.05 |
| 9* | −13.9008 | (d9) | | |
| 10* | −51.4302 | 2.05 | 1.68893 | 31.16 |
| 11* | −25.8433 | 3.80 | | |
| 12 | −9.3062 | 1.00 | 1.75500 | 52.32 |
| 13 | −46.9466 | (Bf) | | |

(Aspherical Coefficient)

In the present embodiment, the lens surfaces of Surface No. 9, No. 10 and No. 11 are formed aspherical. Data of each aspherical surface including the radius of curvature R of the vertex, the conical constant $\kappa$, and the aspherical coefficients $C_4$ to $C_{10}$ are as described below.

[Surface No. 9]
R=−13.9008
$\kappa$=7.6803
$C_4$=4.0315×10$^{-4}$  $C_6$=1.0347×10$^{-5}$
$C_8$=−2.4086×10$^{-7}$  $C_{10}$=2.5207×10$^{-8}$

[Surface No. 10]
R=−51.4302
$\kappa$=2.8125
$C_4$=6.4074×10$^{-5}$  $C_6$=3.3946×10$^{-6}$
$C_8$=−8.6584×10$^{-8}$  $C_{10}$=6.9267×10$^{-10}$

[Surface No. 11]
R=−25.8433
$\kappa$=−0.1002
$C_4$=−3.8958×10$^{-5}$  $C_6$=3.6217×10$^{-6}$
$C_8$=−8.4095×10$^{-8}$  $C_{10}$=4.8008×10$^{-10}$ (Variable Distance Data)

An axial air distance d3 between the first lens group G1 and the second lens group G2, an axial air distance d9 between the second lens group G2 and the third lens group G3, and the back focal length Bf are changed in zooming. Variable distances at the respective focal lengths, that is, in the wide angle end state, in the intermediate focal length state and in the telephoto end state are shown in the following.

| | Wide angle end state | Intermediate focal length state | Telephoto end state |
|---|---|---|---|
| f | 39.9005 | 90.3897 | 142.5030 |
| d3 | 1.6571 | 10.3996 | 16.9302 |
| d9 | 14.3152 | 5.1803 | 0.8000 |
| Bf | 11.3188 | 42.6444 | 68.3712 |

(Amount and Ratio of Movement of the Lens Groups at the Near Distance Focusing)

In the following, there are shown an amount of movement $\Delta_1$ of the first lens group, an amount of movement $\Delta_2$ of the second lens group, an amount of movement $\Delta_3$ of the third lens group, a ratio of movement $\gamma_2$ of the amount of movement of the second lens group with respect to the amount of movement of the first lens group, and a ratio of movement $\gamma_3$ of the amount of movement of the third lens group with respect to the amount of movement of the first lens group when an object at near distance is focused (in a focusing state with the photographing distance of 0.8 m).

| | Wide angle end state | Intermediate focal length state | Telephoto end state |
|---|---|---|---|
| f | 39.9005 | 90.3897 | 142.5030 |
| $\Delta_1$ | 1.9379 | 3.2051 | −4.7701 |
| $\Delta_2$ | 1.3902 | 2.2993 | −3.4219 |
| $\Delta_3$ | 1.0342 | 1.5021 | −5.8013 |
| $\gamma_2$ | 0.7174 | 0.7174 | 0.7174 |
| $\gamma_3$ | 0.5337 | 0.4687 | 1.2162 |

Note that movement of the lens groups toward the object side is considered as positive.

(Value for the Above Conditions)
$f_1$=51.1174
$f_2$=34.8858
$f_3$=−20.6478
$f_{2a}$=−20.7099
$f_{2b}$=16.9025

$\gamma_{3w}$=0.5337  (1)

$\gamma_{3t}$=1.216  (2)

$f_1/(f_t \times f_w)^{1/2}$=0.678  (3)

$$(|f_{2a}|+f_{2b})/f_2=1.078 \quad (4)$$

$$f_1/|f_3|=2.476 \quad (5)$$

$$R_a \times N_a/f_t=0.2520 \quad (6)$$

$$|R_b|/D_a=2.5693 \quad (7)$$

FIGS. 19A through 20L are aberration graphs for showing aberrations of the present embodiment with respect to the line d ($\lambda$=587.6 nm).

FIGS. 19A through 19D, 19E through 19H, and 19I through 19L are aberration graphs for showing aberrations when an object at infinity is focused according to the seventh embodiment of the present invention, respectively showing aberrations in the wide angle end state (f=39.90 mm), in the intermediate focal length state (f=90.39 mm), and in the telephoto end state (f=142.50 mm).

FIGS. 20A through 20D, 20E through 20H, and 20I through 20L are aberration graphs for showing aberrations when an object at near distance is focused (with the photographing distance of 0.8 m) according to the seventh embodiment of the present invention, respectively showing aberrations in the wide angle end state (f=39.90 mm), in the intermediate focal length state (f=90.39 mm), and in the telephoto end state (f=142.50 mm).

From the above aberration graphs, it is clearly seen that the aberrations in all of the focal length states from the wide angle end state to the telephoto end state are satisfactorily corrected in the seventh embodiment and an excellent image formation performance can be obtained.

According to the first aspect of the present invention, it is possible to achieve a variable focal length lens system in a small size with a high zooming ratio in spite of a small number of the constituent lenses.

According to the second aspect of the present invention, it is possible to realize a variable focal length lens system which is suitable for a high zooming operation with a smaller number of lens elements, and which is capable of focusing an object at near distance with a high zooming ratio in a small size.

What is claimed is:

1. A variable focal length lens system comprising, from the side of an object in the order:

a first lens group having a positive refractive power;

a second lens group having a positive refractive power; and a third lens group having a negative refractive power, characterized in that:

while, when the lens positional state is changed from a wide angle end state to a telephoto end state, the respective lens groups are moved toward the object side in such a manner that a distance between said first lens group and said second lens group is increased and a distance between said second lens group and said third lens group is decreased, an aperture stop is disposed in the vicinity of said second lens group and is moved together with said second lens group in response to a change of the lens positional state;

said third lens group is composed of a positive lens with the convex surface facing the image side and a negative lens disposed on the image side of said positive lens to have an air gap therebetween and having the concave surface facing the object side, said positive lens formed as a double aspherical lens and satisfying the following condition:

$$0.9<\kappa a(Ya/Ra)^2<1.3,$$

where:

κa is a conical constant of an image-side lens surface of the double aspherical lens disposed in said third lens group;

Ya is an amount defined by the following expression:

$$Ya=Y\max \cdot (DA/DS),$$

where Ymax is a half of a vertical angle of the frame, DA is a distance from said image-side lens surface to the image plane in the wide angle end state, and DS is a distance between said aperture stop to said image plane in the wide angle end state; and Ra is a paraxial radius of curvature of said image-side lens surface;

said second lens group is, from the object side in the order, composed of a cemented negative lens consisting of a negative lens with the concave surface facing the object side and a positive lens and a positive lens with the convex surface facing the image side; and said aperture stop is disposed between said cemented negative lens and said positive lens, and satisfies the following condition (4):

$$0.75<(|r21|+|r22|)/f2<0.9, \quad (4)$$

where:

r21 is the radius of curvature of a lens surface on the most object side of the cemented negative lens disposed in the second lens group;

r22 is the radius of curvature of a lens surface on the image side of the positive lens disposed in the second lens group; and f2 is the focal length of the second lens group.

2. A variable focal length lens system according to claim 1, wherein said first lens group comprises a cemented positive lens which consists of a positive lens having a double convex form on the most object side and a negative lens with the concave surface facing the object side, and satisfies the following condition (2):

$$1.5<|R2|/D2<4, \quad (2)$$

where:

R2 is the radius of curvature of a cemented surface of the cemented positive lens disposed in the first lens group (R2<0); and D2 is the distance from the cemented surface of the cemented positive lens disposed in the first lens group in the telephoto end state to the aperture stop.

3. A variable focal length lens system according to claim 2, satisfying the following condition (3):

$$0.25<f1/ft<0.4, \quad (3)$$

where:

f1 is the focal length of the first lens group; and ft is the focal length of the entire variable focal length lens system in the telephoto end state.

4. A variable focal length lens system capable of focusing an object at near distance and comprising a first lens group having a positive refractive power, a second lens group having a positive refractive power, and a third lens group having a negative refractive power, from the object side in this order, wherein, when the focal length is changed from a wide angle end state to a telephoto end state, the respective lens groups are moved toward the object side in such a manner that a gap between the first lens group and the second lens group is increased and a gap between the second lens group and the third lens group is decreased, which variable focal length lens system characterized in that:

in the wide angle end state, at least the first lens group is moved toward the object side when an object at near distance is focused; and in the telephoto end state, at least first lens group is moved toward the image side when an object at near distance is focused; and the following conditions (5) and (6) are satisfied:

$$0.2 < \gamma_{3W} < 0.7, \quad (5)$$

and $$1.1 < \gamma_{3t} < 1.5, \quad (6)$$

where:

$\gamma_{3W}$ is a ratio (a movement ratio) of an amount of movement of the third lens group with respect to an amount of movement of the first lens group in the wide angle end state when an object at a near distance is focused; and $\gamma_{3t}$ is a ratio (a movement ratio) of an amount of movement of the third lens group with respect to an amount of movement of the first lens group in the telephoto state when an object at a near distance is focused.

5. A variable focal length lens system capable of focusing an object at near distance according to claim 4, wherein said first lens group is composed of a cemented lens having a positive refractive power, and said cemented lens is a cemented positive lens which consists of a positive lens in a double convex form and a negative meniscus lens with the concave surface facing the object side.

6. A variable focal length lens system capable of focusing an object at near distance according to claim 5, satisfying the following condition (7):

$$0.5 < f_1/(f_t \times f_w)^{1/2} < 0.9, \quad (7)$$

where:

$f_1$ is the focal length of the first lens group;

$f_w$ is the focal length of the entire variable focal length lens system in the wide angle end state; and $f_t$ is the focal length of the entire variable focal length lens system in the telephoto end state.

7. A variable focal length lens system capable of focusing an object at near distance according to claim 6, wherein said second lens group is composed of: a cemented negative sub lens group which consists of two lenses including one negative lens and one positive lens and which has a negative refractive power; an aperture stop; and at least one positive sub lens group having a double convex form, from the object side in this order.

8. A variable focal length lens system capable of focusing an object at near distance according to claim 7, satisfying the following condition (8):

$$0.5 < (|f_{2a}| + f_{2b})/f_2 < 2.3, \quad (8)$$

where:

$f_2$ is the focal length of said second lens group;

$f_{2a}$ is the focal length of the negative sub lens group in the second lens group ($f_{2a} < 0$); and $f_{2b}$ is the focal length of the positive sub lens group in the second lens group.

9. A variable focal length lens system capable of focusing an object at near distance according to claim 8, wherein said third lens group is composed of two lenses including a positive lens with the convex surface facing the image side and a negative lens with the concave surface facing the object side.

10. A variable focal length lens system capable of focusing an object at near distance according to claim 9, satisfying the following condition (9):

$$1.9 < f_1/|f_3| < 2.8, \quad (9)$$

where $f_3$ is the focal length of said third lens group ($f_3 < 0$).

11. A variable focal length lens system capable of focusing an object at near distance according to claim 10, satisfying the following condition (10):

$$0.1 < R_a \times N_a/f_t < 0.5, \quad (10)$$

where:

$R_a$ is the radius of curvature of a surface on the object side of the positive lens having the double convex form in the first lens group; and $N_a$ is the refractive index of the positive lens having the double convex form in the first lens group.

12. A variable focal length lens system capable of focusing an object at near distance according to claim 10, satisfying the following condition (11):

$$1.0 < |R_b|/D_a < 3.8, \quad (11)$$

where:

$R_b$ is the radius of curvature of a surface on the most object side of the negative sub lens group in the second lens group; and $D_a$ is a distance on the optical axis from the surface on the most object side of the negative sub lens group in the second lens group to the aperture stop.

13. A variable focal length lens system capable of focusing an object at near distance according to claim 4, wherein said second lens group is composed of a cemented negative sub lens group which consists of two lenses including one negative lens and one positive lens and which has a negative refractive power, an aperture stop, and at least one positive sub lens group in a double convex form, form the object side in this order.

14. A variable focal length lens system capable of focusing an object at near distance according to claim 13, satisfying the following condition (8):

$$0.5 < (|f_{2a}| + f_{2b})/f_2 < 2.3, \quad (8)$$

where:

$f_2$ is the focal length of said second lens group;

$f_{2a}$ is the focal length of the negative sub lens group in the second lens group ($f_{2a} < 0$); and $f_{2b}$ is the focal length of the positive sub lens group in the second lens group.

15. A variable focal length lens system capable of focusing an object at near distance according to claim 14, satisfying the following condition (10):

$$0.1 < R_a \times N_a/f_t < 0.5, \quad (10)$$

where:

$R_a$ is the radius of curvature of a surface on the object side of the positive lens having the double convex form in the first lens group; and $N_a$ is the refractive index of the positive lens having the double convex form in the first lens group.

16. A variable focal length lens system capable of focusing an object at near distance according to claim 15, satisfying the following condition (11):

$$1.0<|R_b|/D_a<3.8, \tag{11}$$

where:

$R_b$ is the radius of curvature of a surface on the most object side of the negative sub lens group in the second lens group; and $D_a$ is a distance on the optical axis from the surface on the most object side of the negative sub lens group in the second lens group to the aperture stop.

17. A variable focal length lens system capable of focusing an object at near distance according to claim 4, wherein said third lens group is composed of two lenses which includes a positive lens with the convex surface facing the image side and a negative lens with the concave surface facing the object side, 18. A variable focal length lens system capable of focusing an object at near distance according to claim 17, satisfying the following condition (9):

$$1.9<f_1/|f_3|<2.8, \tag{9}$$

where $f_3$ is the focal length of said third lens group ($f_3<0$).

19. A variable focal length lens system capable of focusing an object at near distance according to claim 18, satisfying the following condition (10):

$$0.1<R_a \times N_a/f_t<0.5, \tag{10}$$

where:

$R_a$ is the radius of curvature of a surface on the object side of the positive lens having the double convex form in the first lens group; and $N_a$ is the refractive index of the positive lens having the double convex form in the first lens group.

20. A variable focal length lens system capable of focusing an object at near distance according to claim 19, satisfying the following condition (11):

$$1.0<|R_b|/D_a<3.8, \tag{11}$$

where:

$R_b$ is the radius of curvature of a surface on the most object side of the negative sub lens group in the second lens group; and $D_a$ is a distance on the optical axis from the surface on the most object side of the negative sub lens group in the second lens group to the aperture stop.

21. A variable focal length lens system capable of focusing an object at near distance and comprising a first lens group having a positive refractive power, a second lens group having a positive refractive power, and a third lens group having a negative refractive power, from the object side in this order, wherein, when the focal length is changed from a wide angle end state to a telephoto end state, the respective lens groups are moved toward the object side in such a manner that a gap between the first lens group and the second lens group is increased and a gap between the second lens group and the third lens group is decreased, which variable focal length lens system is characterized in that:

in the wide angle end state, at least the first lens group is moved toward the object side when an object at near distance is focused;

in the telephoto end state, at least the first lens group is moved toward the image side when an object at near distance is focused;

said first lens group is composed of a cemented lens having a positive refractive power, said cemented lens being a cemented positive lens consisting of a positive lens in a double convex form and a negative meniscus lens with the concave surface facing the object side;

said second lens group is composed of a cemented negative sub lens group which consists of two lenses including one negative lens and one positive lens and which has a negative refractive power, an aperture stop, and at least one positive sub lens group in a double convex form, from the object side in this order; and said third lens group is composed of two lenses including a positive lens with the convex surface facing the image side and a negative lens with the concave surface facing the object side.

22. A variable focal length lens system capable of focusing an object at near distance according to claim 21, satisfying the following condition (8):

$$0.5<(|f_{2a}|+f_{2b})/f_2<2.3, \tag{8}$$

where:

$f_2$ is the focal length of said second lens group;

$f_{2a}$ is the focal length of the negative sub lens group in the second lens group ($f_{2a}<0$); and $f_{2b}$ is the focal length of the positive sub lens group in the second lens group.

23. A variable focal length lens system capable of focusing an object at near distance according to claim 22, satisfying the following condition (10):

$$0.1<R_a \times N_a/f_t<0.5, \tag{10}$$

where:

$R_a$ is the radius of curvature of a surface on the object side of the positive lens having the double convex form in the first lens group; and $N_a$ is the refractive index of the positive lens having the double convex form in the first lens group.

* * * * *